(12) United States Patent
Rödiger

(10) Patent No.: US 11,691,557 B2
(45) Date of Patent: Jul. 4, 2023

(54) SAFETY CAB FOR A MOBILE HOME OR CAMPER WITH DEFORMATION ELEMENTS

(71) Applicant: ELDA Entwicklungsgesellschaft mbH, Hamburg (DE)

(72) Inventor: Andreas Rödiger, Hamburg (DE)

(73) Assignee: Elda Entwicklungsgesellschaft Mbh, Hamburg (DE)

( * ) Notice: Subject to any disclaimer, the term of this patent is extended or adjusted under 35 U.S.C. 154(b) by 62 days.

(21) Appl. No.: 17/282,533

(22) PCT Filed: Oct. 11, 2019

(86) PCT No.: PCT/EP2019/077607
§ 371 (c)(1),
(2) Date: Apr. 2, 2021

(87) PCT Pub. No.: WO2020/074710
PCT Pub. Date: Apr. 16, 2020

(65) Prior Publication Data
US 2021/0387673 A1 Dec. 16, 2021

Related U.S. Application Data

(60) Provisional application No. 62/749,847, filed on Oct. 24, 2018.

(30) Foreign Application Priority Data

Oct. 11, 2018 (EP) ..................................... 18199903
Feb. 1, 2019 (DE) ......................... 102019102543.5
Aug. 21, 2019 (DE) ......................... 102019122440.3

(51) Int. Cl.
*B60P 3/32* (2006.01)
*B60R 21/02* (2006.01)
(Continued)

(52) U.S. Cl.
CPC .............. *B60P 3/32* (2013.01); *B60R 21/026* (2013.01); *B62D 21/15* (2013.01); *B62D 25/02* (2013.01); *B60R 2021/0266* (2013.01)

(58) Field of Classification Search
CPC ......... B60P 3/32; B60R 21/026; B62D 25/02; B62D 29/04; B62D 29/043; B62D 29/046; B62D 33/0612
(Continued)

(56) References Cited

U.S. PATENT DOCUMENTS 4,705,716 A * 11/1987 Tang ......................... B32B 5/24
442/224
5,218,792 A * 6/1993 Cooper ................ B62D 33/044
296/210

(Continued)

FOREIGN PATENT DOCUMENTS

DE 2047190 A1 * 9/1970
DE 102017112380 A1 * 12/2017 ............. B32B 27/30
(Continued)

*Primary Examiner* — Jason S Daniels
(74) *Attorney, Agent, or Firm* — Renner Kenner Greive Bobak Taylor & Weber

(57) ABSTRACT

A safety cabin for a mobile home or motor home includes walls of the safety cabin including at least one layer of a fibre-reinforced plastic woven fabric and/or non-woven fabric. A layer includes plies arranged consecutively along a transverse direction with different fibre orientations. A layer is provided in the lateral external walls in each of a front region and rear region of the cabin. An intermediate wall at a transition from the front region of the cabin to the rear region of the cabin is arranged transversely to a longitudinal direction of the cabin, with the intermediate wall preferably comprising a layer including three to nine plies. Similarly, the invention relates to a manufacturing method for the safety cabin according to the invention.

29 Claims, 9 Drawing Sheets

(51) Int. Cl.
*B62D 21/15* (2006.01)
*B62D 25/02* (2006.01)

(58) Field of Classification Search
USPC .................................................. 296/156, 191
See application file for complete search history.

(56) References Cited

U.S. PATENT DOCUMENTS

| | | | | |
|---|---|---|---|---|
| 7,025,166 B2 * | 4/2006 | Thomas | ................... | B60G 3/18 |
| | | | | 180/311 |
| 2009/0053458 A1 * | 2/2009 | Birrell | .................. | B62D 29/043 |
| | | | | 156/60 |
| 2015/0001883 A1 * | 1/2015 | Dame | .................. | B62D 29/043 |
| | | | | 156/293 |

FOREIGN PATENT DOCUMENTS

| | | | | |
|---|---|---|---|---|
| EP | 1336470 A2 * | 8/2003 | ............... | B32B 1/08 |
| EP | 1527866 A1 * | 5/2005 | ........... | B29C 70/083 |

* cited by examiner

Figure 11a:

| | Material | Angle |
|---|---|---|
| External cover layer | GFK | 90°/ 0° |
| | CFK | 0°/ 90° |
| | CFK | +/- 45° |
| | CFK | 90°/ 0° |
| | GFK | 0°/ 90° |
| Hard foam | XPS | |
| Internal cover layer | GFK | 90°/ 0° |
| | CFK | 0°/ 90° |
| | CFK | +/- 45° |
| | CFK | 90°/ 0° |
| | GFK | 0°/ 90° |

Figure 11b:

| | Material | Angle |
|---|---|---|
| External cover layer | GFK | 90°/ 0° |
| | CFK | 0°/ 90° |
| | CFK | 18°/ 72° |
| | CFK | 36°/ 54° |
| | CFK | 72°/ 18° |
| | CFK | 90°/ 0° |
| | GFK | 0°/ 90° |
| Hard foam | XPS | |
| Internal cover layer | GFK | 0°/ 90° |
| | CFK | 90°/ 0° |
| | CFK | 72°/ 18° |
| | CFK | 54°/ 36° |
| | CFK | 18°/ 72° |
| | CFK | 0°/ 90° |
| | GFK | 90°/ 0° |

Figure 11c:

| | Material | Angle |
|---|---|---|
| External cover layer | GFK | 90°/ 0° |
| | CFK | 0°/ 90° |
| | CFK | 30°/ 60° |
| | CFK | 60°/ 30° |
| | CFK | 90°/ 0° |
| | GFK | 0°/ 90° |
| Hard foam | XPS | |
| Internal cover layer | GFK | 0°/ 90° |
| | CFK | 90°/ 0° |
| | CFK | 60°/ 30° |
| | CFK | 30°/ 60° |
| | CFK | 0°/ 90° |
| | GFK | 90°/ 0° |

SAFETY CAB FOR A MOBILE HOME OR CAMPER WITH DEFORMATION ELEMENTS

The invention relates to a safety cabin for a mobile home or motor home comprising a part of the safety cabin arrangeable behind the driver compartment, with walls of the safety cabin comprising at least one layer of a fibre-reinforced plastic woven fabric and/or non-woven fabric. One layer comprises plies following one another along a transverse direction here. Plies directly following one another comprise different fibre orientations here. The layer in the lateral external walls in a front region of the cabin, in relation to an intended main travel direction, preferably comprises at least three to nine plies. In a rear region of the cabin, in relation to an intended main travel direction, the layer in the lateral external walls preferably comprises one to five plies. Additionally, an intermediate wall is present at a transition from the front region of the cabin to the rear region of the cabin arranged transversely to a longitudinal direction of the cabin, with the intermediate wall comprising a layer including three to nine plies. Similarly, the invention relates to a manufacturing method for the safety cabin according to the invention.

BACKGROUND AND STATE OF THE ART

Different structural shapes of mobile homes are commercially available, at present they are primarily alcove vehicles, partly-integrated mobile homes, (fully) integrated mobile homes, liners and/or box vans. What is common to all of them except for box vans is that manufacturers of mobile homes acquire the chassis with driver compartment or only the chassis and then fit it with a structure/attachment, which is used for leisure, holiday, camping purposes, etc. The entire design is rarely undertaken by a vehicle manufacturer. In the case of the above-mentioned vehicle types, the structure is primarily manufactured from a wood framework, aluminium sandwich and/or glass fibre-reinforced plastic (GFP) monocoque. The materials used are usually a material mix of XPS foams, EPS foams, PU foams, etc., which are structured with sheets made of glass fibre-reinforced plastic (GFP) and/or aluminium or wood or other materials to form a sandwich. This structure is valuable and includes a good resistance to weather influences. However, due to the design, it offers the occupants only a low protection to no protection at all from the consequences of any accident since the construction thereof does not provide any or only inadequate mechanical properties. In this case, it was assumed in the past that measures which increase stability and/or safety are costly and complex and significantly increase the weight of the vehicles.

DE 202016103524 U1 discloses a motor home. This is divided into a driver compartment and a living cabin adjacent to the driver compartment. Both regions are separated by a B-column construction, with it comprising fibre-reinforced plastic and being intended for the increased safety of the passengers in the driver compartment.

The structure of such a motor home does not meet the current requirements for passenger safety behind the B-column construction. In particular in the case of a lateral impact or a roll-over of the motor home, such a construction leads to severe damage, which can result in considerable personal injury if occupants are located in the rear region of the motor home.

DE 102007026762 A1 discloses reinforcement elements with glass fibre reinforcements for a vehicle body. The reinforcement elements described in the document are only introduced in the body, in particular in the frame of the body. In this case, these reinforcement elements as a whole still do not meet the required safety standards for mobile homes and motor homes.

U.S. Pat. No. 8,474,871 B1 describes a frame structure for a floor region of caravans and mobile homes made of fibre-reinforced longitudinal and transverse beams. A plurality of fibre layers are placed one on top of another to connect the beams to one another and to a floor panel. Glass and carbon fibres are used.

As already mentioned for the other documents, such a design does not meet the required safety standard to transport passengers in the region of the living cabin. Since only the floor region is reinforced, a lateral impact would still lead to severe damage to the living cabin. In particular, the walls do not comprise reinforcement elements such that they offer little protection in the case of a lateral impact and/or roll-over.

Object of the Invention

The object of the invention is to provide a mobile home or motor home without the disadvantages of the state of the art.

In particular, an object of the invention was to provide a mobile home or motor home which significantly improves the safety of the vehicle without significant constructive additional complex and without (notable) increase to the vehicle weight. In this case, the manufacturing costs and/or retrofitting costs will also be kept as low as possible.

SUMMARY OF THE INVENTION

The object is achieved by the features of the independent claims. Advantageous configurations of the invention are described in the dependent claims.

In a first aspect, the invention relates to a safety cabin for a mobile home or motor home comprising a part of the safety cabin arrangeable behind a driver compartment, characterised in that walls of the safety cabin comprise at least one layer of a fibre-reinforced plastic woven fabric and/or non-woven fabric, with a layer comprising plies following one another along a transverse direction, with plies directly following one another comprising different fibre orientations with respect to one another, with the layer in the lateral external walls in a front region of the cabin, in relation to an intended main travel direction, preferably comprising at least three to nine plies, with the layer in the lateral external walls in a rear region of the cabin, in relation to an intended main travel direction, preferably comprising one to five plies, with an intermediate wall being present at a transition from the front region of the cabin to the rear region of the cabin arranged transversely to a longitudinal direction of the cabin, with the intermediate wall comprising a layer including preferably three to nine plies. Surprisingly, it has been advantageously found that the synergy of all features leads to a technical overall success. The safety cabin of the mobile home or motor home illustrated here exhibits particularly advantageously improved features in relation to the safety of the passengers. The passengers or occupants of the safety cabin are protected to a particular extent for example in the case of roll-overs of the vehicle, in the case of laterally and rearward occurring accidents. Additionally, the structure surprisingly advantageously leads to good heat insulation inside the cabin and to improved properties in regard to sound volume inside the cabin.

In a preferred further embodiment, the safety cabin is characterised in that just as many plies are included in the front region as in the rear region.

In a preferred further embodiment, the safety cabin is characterised in that more plies are included in the front region than in the rear region. Particularly advantageously, in this way the rear region of the safety cabin acts as a deformation zone or crumple zone in the case of collisions at the rear, whereby the collision energy is absorbed to a particularly high degree and the safety of passengers in the front region increases.

According to the invention, external walls are preferably defined in that they enclose the safety cabin. In this way, the safety cabin preferably comprises three external walls:
two external walls arranged laterally (parallel to the main travel direction) in relation to the main travel direction and
one external wall arranged at the tail of the vehicle (transversely to the main travel direction), which represents a connection to both lateral external walls.

The longitudinal direction of the cabin or safety cabin is preferably the direction of the main travel direction.

According to the invention, the plies of a layer following one another are preferably arranged along a transverse direction. The transverse direction is in this case particularly preferably the direction which is transverse to the longitudinal direction or longitudinal axis of a wall. In this case, the transverse direction in the laterally arranged external walls is transverse to the main travel direction and in the external wall arranged at the tail and in the immediate wall is parallel to the main travel direction.

In a further configuration of the invention, the lateral external walls preferably comprise a front and a rear side. The front side of an external wall of a mobile home and motor home is preferably the surface directed inwards into the interior of the safety cabin. The rear side of an external wall is therefore preferably the surface directed outwards.

In a further configuration of the invention, the external wall can consist of a plurality of wall parts and/or of a plurality of walls following one another. The external wall is preferably configured from a front or a rear wall. The front side of the external wall preferably comprises a front wall. The rear wall is preferably located on the rear side of the external wall.

According to the invention, the main travel direction is preferably the direction in which the vehicle is preferably moved the majority of the time on the basis of the traffic regulations. In some statements in the document, the main travel direction is also simply shortened to the travel direction.

According to the invention, plies directly following one another are preferably configured such that they are present arranged directly next to one another without an intermediate ply.

In a further aspect, the invention relates to a safety cabin for a mobile home or motor home, with at least one stabilising deformation element made of fibre-reinforced plastic and/or metal foam being included in at least one region of the cabin which is preferably at least partially present in an external region of the safety cabin, with the fibre reinforcement and/or the metal foam being configured to increase the strength (preferably the tensile strength, compressive strength, bending strength and/or flexural strength) of the safety cabin and/or to convert kinetic energy (preferably in tension work and/or deformation work) in the case of at least partial inelastic impact of the safety cabin, with at least one stabilising deformation element being present introduced in at least one region of the cabin.

A safety cabin differs from a conventional structure preferably in that a deformation element is present in regions which are particularly critical to safety. As a result, the stability of the structure should be increased in the case of an accident and its behaviour as a crumple zone improved. To this end, firstly preferably suitable, particularly critical regions are determined. In addition, the deformation element itself should comprise suitable physical properties. The element comprises fibre-reinforced plastic, e.g. a stable sheet, a square or round element or a honeycombed structure made of fibre-reinforced plastic which will be/is preferably laminated and thus forms a deformation element made of fibre-reinforced plastic introduced into the cabin. The fibre-reinforced plastic is preferably in this case carbon fibre-reinforced plastic (CFP) and/or comprising reinforcements made of aramide fibres.

The safety cabin preferably comprises the external regions, e.g. the external walls of the structure and/or the body of the mobile home or motor home. The entire body, the passenger compartment and/or the structure or the cabin can also preferably mean the safety cabin. Further elements, such as e.g. the chassis and inner walls, can also be included.

It may also be preferred that the safety cabin comprises the driver compartment, in particular in the case of fully-integrated mobile homes. It may also be preferred that the cabin comprises only the part of the mobile home, which does not belong to the driver compartment. A safety cabin differs from a conventional cabin or passenger compartment of a mobile home and/or motor home preferably in that the safety of the cabin is increased when compared to them, in particular by introducing at least one deformation element.

By using at least one stabilising deformation element, the safety of the passengers can be significantly improved to protect against accidents. In this case, a specialist evaluation can determine suitable regions of the cabin, which are particularly vulnerable in an accident, are particularly important to the stability of the cabin and/or, for other reasons, have a particular significance for accident safety. This determination can primarily be carried out by evaluating crash tests and/or theoretic calculations. One or a plurality of deformation elements can be attached here at respectively suitable locations/suitable regions. However, it may also be a continuous deformation element which comprises e.g. a plurality of suitable regions.

The deformation element increases the safety here in the case of accidents, preferably through its stability and/or strength properties, through a preferred tensile and/or compressive strength, through a preferred modulus of elasticity and/or through other relevant properties. These properties of the element are present both by themselves and also in a preferably synergistic interaction with the other elements of the cabin. Thus, all the properties of the cabin can preferably be influenced beyond the regions of the deformation element in the desired manner.

To this end, the deformation element is introduced into the safety cabin. This means in particular that the deformation element can interact with the other elements of the safety cabin such that it increases the stability and/or accident safety. For example, the deformation element can be attached and/or introduced at an internal and/or external surface of the safety cabin, e.g. by connecting (joining) by for example adhering, riveting, welding, screwing, nailing, soldering, vulcanising, laminating, a magnetic connection, a suction connection, a clamping connection and/or generally a frictional or positive connection.

The deformation element is preferably at least partially present in an external region of the safety cabin. This means in particular that the external region comprises the deformation element or even substantially or partially is formed therefrom. Similarly, it may be that the deformation element, e.g. parts of a transverse beam and/or an internal wall is inside the cabin, however, parts of the deformation element are then also included in the external region, e.g. on the connection elements of the deformation element to the external region. It can for example be angled accordingly and/or comprise connection surfaces such that a stable connection is made possible with the external region.

An external region preferably comprises all elements of the safety cabin, which comprise an external surface thereof, e.g. the external walls.

The fibre reinforcement and/or the metal foam is preferably configured to increase a strength, preferably a tensile strength, compressive strength, bending strength and/or flexural strength, the safety cabin and to convert kinetic energy, preferably into tension work and/or deformation work, in the case of an at least partial inelastic impact of the safety cabin. This means that the deformation element, which is fibre-reinforced and/or comprises metal foam, is introduced at the corresponding locations and the fibres and/or the metal foam, on the one hand, themselves comprise the corresponding properties, in the case of the fibre reinforcement along the longitudinal direction of the fibres, on the other hand, the alignment of the fibres and/or the metal foam is carried out such that these properties come into effect in the case of increasing the strength of the cabin and/or converting kinetic energy in the case of an impact due to an accident.

On the one hand, the stability and/or strength, at least of regions of the cabin, should be increased, on the other hand, the energy resulting in the case of an accident should preferably be absorbed and/or directed such that it is minimised as far as possible for the occupants. Findings from crash tests and/or calculations are preferably used to identify suitable regions to introduce a deformation element.

In the case of accidents, two factors in particular frequently play a role: on the one hand, preferably the stability of a passenger compartment, body and/or safety cabin. This is in particular suitable for ensuring a well-defined survival space for the occupants, in which to leave an occupant substantially in the relative position inside the vehicle, in which he was located before the accident, and/or to protect them against parts of the passenger compartment, body and/or safety cabin and other objects from the inside and/or outside of the passenger compartment, body and/or safety cabin. Furthermore, a passenger compartment, body and/or safety cabin should advantageously comprise a deformation zone or crumple zone to increase the safety. This should convert the kinetic energy in the case of an accident, which also represents a significant risk to the occupants in the case of high stability of the passenger compartment, body and/or safety cabin, substantially and/or at least partially into deformation energy or deformation work of the material. These properties will be called preferably (energy) conversion capability below.

The person skilled in the art knows that both properties can preferably be in a dependency and/or interaction with one another here. The mentioned properties preferably play an important role when carrying out crash tests and can be influenced by suitable material properties in the desired manner. A person skilled in the art knows how he must choose e.g. softness, elongation at break, tensile strength, modulus of elasticity and/or stability and a preferred directional dependency of safety cabin, deformation element(s) or components comprising them in order to achieve the desired properties. Similarly, these properties can, like a general increase in accident safety, be measured by crash tests and/or theoretically calculated.

Similarly, it may also be preferred to convert only one property of the safety cabin, preferably only the stability or strength or only convert kinetic energy into another form of energy, preferably harmless to the passengers, by using deformation elements.

In particular, however, both properties should be increased to a suitable extent, advantageously to increase the passenger safety.

A person skilled in the art knows how modern crash tests are carried out and which measuring and evaluating methods are used. Through crash tests, it can be advantageously determined where the introduction of a deformation element will increase the stability of the cabin to the desired extent and/or particularly significantly and to what extent the safety will be increased by introducing it. In this case, regions can preferably be particularly relevant which are statistically frequently affected in the case of accidents and/or regions which are particularly significant for the statics of the cabin and/or as the crumple zone. To determine these regions, accident statistics, physical (computer) analyses and/or theoretic calculations as well as crash tests can preferably be used. In this case, crash tests can for example be carried out with and without deformation element or safety cabin for the purposes of comparison.

Taking into account crash tests and/or theoretic considerations for identifying suitable regions (safety-relevant regions) for a deformation element is also preferably called analysing to determine safety-relevant regions. In the case of this analysis, in particular stability and/or conversion capability should be examined.

These aforementioned properties, in particular stability/strength and/or conversion capability should particularly characterise a safety cabin and/or a deformation element and its safety-reinforcing effect for a mobile home and/or motor home. The meaning of the noun, "safety" or the adjective "safe" in connection with a characterisation of the safety cabin and/or the deformation element preferably includes these properties.

An increase in strength, preferably tensile strength, compressive strength, bending strength and/or flexural strength of the safety cabin can in particular be achieved by a high tensile strength of the fibres used for the fibre reinforcement and/or of the metal foam used and by a high modulus of elasticity of the fibres and/or of the metal foam. These (fibre) properties are high in particular along a fibre longitudinal direction. Bundling suitable fibres, embedding into a suitable plastic matrix and/or the alignment of the fibres in at least one direction can influence the fibre properties even the mentioned properties of the safety cabin. The properties of the metal foam can also be suitably adapted. Similarly, the conversion of kinetic energy preferably into tension work and/or deformation work in the case of an at least partial inelastic impact of the safety cabin, i.e. an accident of the mobile home or motor home, can also be influenced by the fibres and/or the metal foam in the aforementioned manner. The relevant property of the fibres and/or of the metal foam is, however, in this case preferably the elongation at break of these fibres and/or of the metal foam, which means in particular the relative longitudinal expansion of a fibre or of the metal foam as a percentage (%) before it breaks or tears. This is preferably also determined and/or influenced by the toughness of the fibres and/or of the metal foam. Similarly, the partial conversion of kinetic energy into friction work can be preferred in the case of the conversion.

However, further properties (of the deformation element) may also be preferred to increase the (accident) safety, such as e.g. a low combustibility and/or flammability. For the assessment, the flame point, the burn point and/or the ignition temperature can for example be used.

A safety cabin and/or a deformation element is preferably not easily combustible and/or according to DIN EN 13501 or DIN 4102 not easily flammable.

To this end, a safety cabin and/or a deformation element can for example comprise a flame protection means and/or materials that are not easily combustible, such as e.g. determined fibre materials and/or metal foams.

The accident safety can preferably be synergistically increased by deformation elements, which are introduced into suitable regions of the safety cabin. In this case, the deformation element is preferably also introduced into an existing passenger compartment and/or body. Similarly, the deformation element can, however, also be a body or structural part of the safety cabin.

Deformation elements can preferably also be retrofitted. Thus, an already manufactured vehicle can be made safer without significant effort. This will save resources.

In a preferred embodiment, the deformation element comprises a non-woven material, e.g. comprising carbon fibres in a plastic matrix. This can be introduced or attached either when constructing the safety cabin or in a retrofitting process at a suitable location. The introduction or attachment can occur in particular in the case of a retrofit, through automated or manual lamination.

A deformation element can preferably be and/or comprise a flat element. Flat element preferably means that it has substantially an extension along two dimensions and in particular only one insignificant extension into the direction perpendicular to this plane.

The term "metal foam" is preferably understood as a three-dimensional, metallic, cellular structure with a substantial volume proportion of pores filled with air. Metal foams and their manufacture are known to the person skilled in the art. Metal foam or porous metallic material preferably describes foamed metallic materials. Metal foams have, in particular due to pores and cavities, a lower density than solid metals made of the same material, but advantageously also have a high (specific) rigidity and/or strength. In particular, metal foams enable an increased absorption capability of kinetic energy, e.g. when used in a body or safety cabin in the case of an accident/impact of the vehicle. Metallic foams therefore preferably exhibit a good or increased mechanical energy absorption ability.

Aluminium or aluminium alloys are preferably foamed due to the low density. By using suitable blowing agents, it is preferably also possible to manufacture foams from copper, zinc, lead or steel/iron. Metal foams are preferably manufactured from metal powder and a metal hydride, e.g. titanium dihydride. Both powders are preferably mixed and thickened by sintering and/or extruding to form a primary material, which is then heated in particular to a temperature above the melting point of the metal, with the e.g. titanium dihydride preferably releasing gaseous hydrogen and foaming the mixture. It is also preferably possible to manufacture metal foams by blowing gas into a metal melt, with the melt preferably having been made foamable by adding solid constituents. For aluminium alloys, e.g. for stabilisation, 10-20% by volume of silicon carbide or aluminium oxide are added. The addition of calcium is preferably also possible. In this way, an alloy is in particular formed, whereby the viscosity is advantageously increased and/or the melt is stabilised. Similarly, the manufacture of metal foam is preferably possible by the slip reaction foam sintering process (SRFS process), in particular for the manufacture of iron, steel and/or nickel foam. In the case of this method, a slip is preferably foamed by means of hydrogen formed by reacting acid with the respective metal powder, bonding of the foam structure is preferably achieved by further reaction products, which are subsequently preferably dried in a mould and/or sintered under reducing atmosphere or in a vacuum. For low-melting metals (aluminium, zinc and/or lead), a manufacturing method preferably exists for open-pore metal foams by casting with salt. The liquid aluminium, zinc and/or lead is preferably cast together with crystal salt (NaCl), with e.g. the salt being washed out e.g. following mechanical subsequent treatment. In this case, the salt grains and/or their contact points are in particular replaced with pores. In the case of this manufacturing technology, the pores are preferably substantially connected to one another (open). Such a metal foam advantageously has a porosity of 50 to 65% and settable pore size of 0.2 mm to 4 mm.

Composite metal foam (CMF) is preferably included with the term used, metal foam. Composite metal foam is preferably formed from metal hollow balls in a solid matrix of another metal, such as steel in aluminium. CMF has in particular a 5 to 6 times higher strength to density ratio and/or a more than 7 times higher energy absorption than other metal foams and is therefore particularly advantageous. The use of a Kevlar and/or aramide metal foam (ceramic) composite material is e.g. particularly preferable.

In particular, the joint use of at least one deformation element comprising fibre-reinforced plastic and metal foam or the combination of deformation elements, with in each case at least one element preferably comprising fibre-reinforced plastic and in each case one element metal foam. In this case, synergistic effects advantageously emerge in relation to the safety of the cabin in the case of accidents due to the material properties of fibre-reinforced plastic and metal foam which complement each other in a synergistic and improved manner.

In a preferred embodiment of the safety cabin, the deformation element comprises a tensile strength of more than 2000 MPa (mega pascal), preferably more than 3000 MPa and in particular more than 3500 MPa. It was surprising that through the obvious tensile strengths a significantly improved safety of the cabin could be achieved. Therefore, the deformation element is particularly stable with respect to tensile loads. They play a significant role in accidents. Thus, the safety of the entire cabin is surprisingly increased, even in regions, where there is no deformation element present. In this case, a person skilled in the art knows that material tables list properties such as density, tensile strength and modulus of elasticity and can therefore find suitable materials from such lists. In this case, it may be preferred that the material properties, in particular tensile strength and/or modulus of elasticity are isotropic properties. Similarly, it may, however, be preferred that these properties are anisotropic and present only in at least one determined direction inside the material or differ in different directions inside the material. Thus, a very individual adaptation of the deformation element can be carried out for which an analysis is used to determine safety-relevant regions.

Often, it is primarily in the case of deformation elements comprising carbon fibre-reinforced plastic that in particular along one fibre direction a particularly high tensile strength and/or modulus of elasticity can be achieved. This can be used for selectively influencing the preferably anisotropic stability and/or conversion capability. Thus, through fibres laid selectively along determined directions, the desired properties can be achieved in a customised manner along this direction, in particular without a significant weight increase being caused by the fibres, as would occur for example with fibres laid substantially isotropically. The (anisotropic) properties can preferably also be described by a tensor.

It may also be preferred to describe the deformation element using the modulus of elasticity, e.g. moduli of elasticity of greater than 50 GPa (giga pascal), preferably greater than 90 GPa may be preferred for the substantially used material. It may also be preferred that the modulus of elasticity is less than 90 GPa, particularly preferably less than 50 GPa.

In a further preferred embodiment of the invention, the fibres of the fibre reinforcement and/or of the metal foam comprise a tensile strength of at least 2700 MPa, preferably at least 2850 MPa, more preferably at least 3000 MPa and in particular at least 3500 MPa and/or a modulus of elasticity of at least 70 GPa, preferably at least 100 GPa, more preferably at least 230 GPa and in particular at least 370 GPa and/or an elongation at break of at least 0.7%, preferably at least 1.5%, more preferably at least 2.7% and in particular at least 3.5%, in preferably at least one direction. In this manner, the aforementioned properties can be particularly easily achieved. A person skilled in the art knows here how these properties are to be achieved, for example by suitable fibre material and/or fibre densities and/or number of the fibres connected together to form a so-called fibre bundle and/or roving. Advantageously, the metal foams or the metal foam also comprise properties mentioned above for the fibres of the fibre reinforcement. These properties and the resulting advantages are discernible to the person skilled in the art and transferable to the properties of a metal foam. In the case of fibre reinforcements, the at least one direction relates to a longitudinal direction of at least one fibre. In the case of the metal foam, the direction preferably relates to a preferred direction. In the case of a metal foam, mentioned properties can also be given particularly preferably in two or three spatial directions of the deformation element.

In particular, the tensile strength and/or the modulus of elasticity or the tensor describing these properties preferably serve to characterise the stability and/or conversion capability of the deformation element. The conversion properties can primarily be positively influenced by an anisotropy of the stability properties through a preferred direction for directing the energy transferred during an accident to the deformation element.

It may also be preferred to describe the deformation element using the density. For example, a density of the material substantially used for the deformation element can preferably be between 1 and 2 g/cm$^3$. Thus, particularly light deformation elements can be provided which do not significantly increase the consumption of a mobile home and/or motor home, cause only low energy costs (fuel) and are friendly to the environment.

Terms such as substantially, around, roughly, approx. etc, preferably describe a tolerance range of less than ±40%, preferably less than ±20%, particularly preferably less than ±10%, even more preferably less than ±5% and in particular less than ±1%. 'Similar' preferably describes sizes which are around the same. 'Partially' preferably describes up to at least 5%, particularly preferably up to at least 10% and in particular up to at least 20%, in some cases up to at least 40%.

An area density to describe the material substantially used may also be preferred. For example, an area density of between 100 g/cm$^2$ and 300 g/cm2 and in particular of between 200 g/cm$^2$ and 220 g/cm$^2$ may be preferred for this material. The deformation elements are preferably substantially flat. Therefore, the area density may in particular be suitable to describe particularly light deformation elements, which can be easily retrofitted due to their low weight without the motorisation and/or design of the chassis having to be changed.

A deformation element is quite particularly preferred which comprises either the combination of these preferred stability and density properties itself and/or the substantially included material. Thus, the safety of the cabin can be significantly improved without notable weight increase.

In a preferred embodiment of the invention, the deformation element has an extension of at least 1 to 300 cm in one direction. A deformation element can comprise many, preferably different, extensions within this range, depending on whether it is e.g. an element of the external wall of the safety cabin (preferred sizes 55 cm to 250 cm) or stabilising individual elements, such as e.g. the angular element (preferred sizes 5 cm to 110 cm). It was surprising that the safety could be significantly improved in the case of a deformation element of these sizes.

The deformation element, in particular a flat deformation element, preferably has an area of less than 6 m$^2$. External walls typically comprise areas in the range of 2 m$^2$ to 6 m$^2$, while e.g. angular elements are instead 25 cm$^2$ to 1.5 m$^2$ in size.

Similarly, it may be preferred that the (flat) deformation element comprises a thickness of less than 30 cm, preferably less than 20 cm, more preferably less than 10 cm, even more preferably less than 5 cm, quite highly preferably 2 cm or less and in particular 1 cm or less. Such elements are particularly easy to manufacture.

In a further preferred embodiment of the safety cabin, the deformation element comprises carbon fibre-reinforced plastic.

A carbon fibre-reinforced plastic is known to the person skilled in the art and preferably comprises reinforcement fibres made of carbon and a plastic matrix which beds the fibres. Plastic advantageously means a material which comprises polymers. Since the fibres advantageously comprise a higher rigidity than the matrix, any acting load or force is preferably directed along the fibres.

A fibre is in particular a linear, elongated structure which consists of a fibre material and comprises a fibre shape, with the elongated shape being e.g. smooth or wrinkled and the cross-sectional shape for example being round or angular. Fibres primarily designates thin threads of preferably a few micrometers in diameter. However, thicker and/or thinner fibres are also known and can be used.

A carbon fibre can for example comprise graphite-like sp2-bonded carbon.

Known and preferred carbon fibre types, preferably also called carbon fibres, comprise fibres with the following characterisations: HT (High Tenacity)—high-strength, UHT (Ultra High Tenacity)—very high-strength, LM (Low Modulus), IM (Intermediate Modulus)—intermediate, HM (High Modulus)—highly rigid, UM (Ultra Modulus), UHM (Ultra High Modulus), UMS (Ultra Modulus Strength) and/or HMS (High Modulus/High Strain)—highly rigid/high-strength. These characterisations correspond to industrial standard designations and are known to the person skilled in the art. Thus, depending on the requirements for stability and/or conversion capability, a suitable fibre can be used.

The fibre materials of the carbon fibres are for example selected from the group comprising rayon/viscose (cellulose), polyacrylonitrile (PAN), polyepichlorohydrin (PECH), polyethylene oxide (PEO) and/or polyvinyl alcohol (PVA). They are suited for simple and favourable manufacture.

It may also be preferred that the carbon fibres are selected from the group comprising cellulose in general, flax, hempflax, sisal and/or wood. In this manner, particularly ecologically compatible deformation elements can be manufactured, which also absorb the energy during an accident particularly well and can suitably transfer it (conversion capability).

Advantageously, a carbon fibre can also be selected from a group comprising aramide, poly(p-phenylene-2,6-benzobisoxazole) (PPBO), polyester, nylon, ultra high molecular weight polyethylene, polyethylene and/or polymethly methacrylate. Fibres of these preferred variants are particularly versatile, robust and/or stable and for example have a high temperature and/or chemical resistance, a low combustibility and other advantageous properties.

The plastic can preferably comprise a thermoplastic, a duroplastic and/or an elastomer material. Thermoplasts are easy to process. Duroplasts are also preferably particularly stable under high temperatures. Elastomer comprise in particular a high conversion capability.

The plastic can e.g. consist of resin and/or curing agents. Both condensation resins and reaction resins can be used which, unlike the former, generally cure without the splitting-off of volatile components, solely by polymerisation or polyaddition. As a result, harm to the health of people involved in the manufacture can advantageously be avoided.

Curing agents are preferably understood as materials which in particular together with the resin used lead to a curing into a solid material, primarily into a solid plastic. Curing agents are preferably selected from the group comprising polyamines, amine adducts, polyamino amides, ketimines, polyisocyanates, blocked isocyanates, cyanoguanidine, amidines, anhydrides or dicarboxylic acids, carboxy group-containing polyester resins, dicarboxylic acids, aldehydes, ketones and/or divinylbenzenes, diallyl phthalate and/or triglycidyl isocyanurate. These are particularly cost effective and easy to manufacture.

The plastic and/or curing agent preferably comprises a thermoplastic material and is e.g. selected from the group comprising polyether ether ketone (PEEK), polyphenylene sulphide (PPS), polysulfone (PSU), polyetherimide (PEI), polytetrafluoroethylene (PTFE). Similarly, duroplastic materials can primarily be used such as epoxy resin (EP), unsaturated poly ester resin (UP), vinyl ester resin (VE), phenol formaldehyde resin (PF), diallyl phthalate resin (DAP), methacrylate resin (MMA), polyurethane (PUR), melamine resin (MF/MP) and/or urea resin (UF). In this case, a suitable curing agent is preferably used.

Elastomers preferably comprise polymers. Elastomers are for example vulcanisates of natural rubber and/or silicon rubber.

A manufacture of carbon fibre-reinforced plastic can preferably include the following steps and/or elements: Use of prepregs in the extrusion or autoclave process (particularly high-value and improved carbon fibre-reinforced plastic), fibre windings, infusion or RTM processes (particularly cost-effective manufacture). CFP hand laminates (deformation elements that can be particularly easily and effectively retrofitted).

Carbon fibre-reinforced plastic is particularly suitable for increasing the safety and can be easily processed and adapted to various shapes. The aesthetic can also be increased. Carbon fibre reinforced-plastic uniquely brings together low weight and high stability (modulus of elasticity, tensile strength). It is not without reason that the use of these materials is otherwise substantially known from aerospace and anti-ballistics. However, it was surprising that use for a safety cabin for a mobile home or motor home significantly stability and safety without significantly (notably) changing the weight, consumption and driving properties.

In this case, it is particularly preferred to achieved suitable/desired safety properties through a special alignment and/or laying of the fibres. This is geared in particular towards the analysis to determine safety-relevant regions.

A retrofitting of deformation elements in the form of carbon fibre-reinforced plastics is also particularly simple since they often comprise the shape of mats. Such mats can be particularly easily introduced afterwards into an existing cabin at a suitable location, e.g. by laminating.

Carbon fibre-reinforced plastic in particular comprises a fibre reinforcement in the form of a unidirectional and multi-axial non-woven fabric (or woven fabric and/or non-woven material), which in particular comprises high-value carbon, glass and/or aramide fibres and can be laminated with resin. Such a fabric is advantageously high strength and ultra light (weight/density) at the latest in the laminated state, can be easily draped when introduced, is easy to process and is compatible with the most varied of resin systems.

The further processing can in particular include the following processes: Wet laminating, pressing or RTM (resin transfer moulding). Pre-impregnated materials (prepregs) are also preferred.

In a preferred embodiment, the carbon fibre-reinforced plastic comprises aramides. Aramides are preferably polyamides with aromatic groups in the main chain, where at least 85% of the amide groups are bonded directly to two aromatic rings. However, aromatic polyamide-imides can also be included. Aramides are preferably selected from the group comprising meta-aramides, para-aramides and/or para-aramide copolymers. Aramides can include poly(p-phenylene terephthalamide) (PPTA, commercial names: Kevlar, Twaron) and/or poly(m-phenylene isophthalamide) (PMPI, commercial names: Nomex, Teijinconex).

The use of Sigratex for the deformation element is particularly preferred. In particular, the use of Sigratex H W215-TW2/2 from the manufacturer, SGL Carbon or identical materials from other manufacturers is preferred such that it comprises surprisingly good safety properties. They may be present in the form of non-woven fabrics, woven fabrics and/or a non-woven material and are introduced into a safety cabin in accordance with known and mentioned techniques.

Individual, very fine fabrics can preferably be combined in the fibre reinforcements to form so-called rovings. A fibre roving is preferably a bundle, strand and/or yarn of fibres arranged in parallel. The number of combined fibres is indicated in particular with the filament count which preferably directly corresponds to this number. Units of thousands of fibres are in this case preferably shortened to k, 50,000 fibres in a roving therefore corresponds to in particular 50 k.

The fineness is preferably indicated in tex. Tex corresponds in particular to the mass in grams per thousand meter length of a fibre or a roving. A surprisingly high tensile strength or a surprisingly high modulus of elasticity can be achieved by the preferred parameters with simultaneously low weight and therefore low density. The fibres combined to form a roving are synergistically influenced here. It is the case for the filament (synonym: k number, number of filaments) that the higher this number is, the more stable the fibre reinforcement.

Fibre reinforcements can preferably be used which comprise non-woven fabric, woven fabric and/or non-woven material. Non-woven fabrics are preferably non-woven mats of parallel carbon fibres, which are fixed in place by connection means. They can preferably be both unidirectional and multi-axial, which in particular means that all fibres and all included plies are oriented in one direction (unidirectional) or comprise a plurality of orientation directions (multi-axial). Woven fabrics preferably comprise woven fibres such as in the case of textiles and can e.g. comprise the shape of mats and/or woven fabric strips. In the case of non-woven materials, short fibres (e.g. under 10 cm) are preferably included. In this case, the fibres can preferably be woven with one another in a "felt-like" manner. Isotropic non-woven materials (fibre directions statically substantially evenly distributed) and/or oriented non-woven materials (preferred direction of the fibres present) can preferably be used.

Different fibre types with different properties can preferably be used for all mentioned fibre reinforcements, e.g.: Carbon fibres preferably comprising HT fibres with a number of filaments of 1,000 to 50,000, a tensile strength of 3,500 MPa (mega pascal) or higher, a modulus of elasticity of 230 GPa (giga pascal) or higher and an elongation at break of 1.5% of higher. In this case, all properties preferably apply per roving and/or in the fibre longitudinal direction. Similarly, any carbon fibres used can preferably be HM fibres (high modulus) with a number of filaments of 1,000 to 50,000, a tensile strength of 2,700 MPa or higher, a modulus of elasticity of 370 GPa or higher and/or an elongation at break of 0.7% or higher. Similarly, aramide fibres can preferably be included, e.g with a fineness of 80 to 400 tex, a tensile strength of 2,850 MPa or higher, a modulus of elasticity of 70 GPa or higher and/or an elongation at break of 3.4% of higher (so-called standard modulus). Similarly, the aramide fibres can preferably be intermediate and/or high modulus fibres with preferably a fineness of 40 to 400 tex, a tensile strength of 2,850 MPa or higher, a modulus of elasticity of 100 GPa or higher and/or an elongation at break of 2.7% or higher. Similarly, glass fibres can preferably be included, preferably low emissivity glass (preferably aluminium borosilicate glass with less than 2% alkali oxides; which is used as standard for the general plastic reinforcement), preferably with a fineness of 30 to 3,500 tex, a tensile strength of 3,000 MPa or higher, a modulus of elasticity of 70 GPa or higher and/or an elongation at break of 3.5% or higher. Similarly, mixed types of the mentioned fibre types are preferably also used as fibre reinforcement.

The fibre reinforcements in the form of non-woven fabrics, woven fabrics and/or non-woven materials are characterised by the following properties: Material selection (preferably carbon, glass and/or aramide and hybrid, i.e. a plurality of types comprising; woven fabric type (unidirectional, biaxial, triaxial, quadriaxial, non-woven material with bi, tri and quadri preferably denoting two, three and four different fibre directions); surface density, indicated in grams per square centimetre (g/cm$^2$); bonding type in the case of woven fabrics, preferably plain weave, twill weave (preferably diagonally running rib, preferred types 2/2, 4/4) and/or satin weaves (also known as atlas weaves, preferred type 1/7). Preferred fibre orientations are: 0° (unidirectional), 0/90°, −45°/+45° (both biaxial), 0°/−45°/+45° (triaxial), 0°/−45°/90°/+45° (quadriaxial) or in the case of non-woven materials isotropic, anisotropic 0°, anisotropic −45°/+45°. Preferred fixings are one-sided meshes, two-sided meshes, sewn and/or not fixed. Furthermore, binder application/grammage and/or marking threads can be included in the case of non-woven materials. Manufacturing or further processing steps of the fibre reinforcements can preferably include: Prepreg manufacture, wet laminating, infusion, wet pressing and/or resin transfer moulding (RTM).

In the case of woven fabrics, strips and/or non-woven materials, carbon fibres with 1 k, 3 k, 6 k, 12 k and 24 k (number of filaments) can preferably be included as the material basis. Woven hybrid materials with glass and/or aramide fibres can in particular be used. They offer high strength, rigidity and improved thermal and electric conductivities. They are advantageously compatible with different resin systems and are particularly flexible as a result.

In a preferred embodiment of the invention, the metal foam comprises a metal selected from the group comprising aluminium, iron, steel, nickel, zinc and/or lead. Gallium, gold, copper, magnesium, mercury, tungsten, titanium, silver, ruthenium, rhodium, platinum, palladium, osmium, sodium, molybdenum, manganese, cobalt, potassium; iridium, indium, chromium, cadmium, bismuth, beryllium and/or (white) tin and/or alloys of the aforementioned or comprising aforementioned materials can be included. Desired properties of the deformation elements can be particularly easily achieved with these materials. In addition, a simple and cost-effective method of manufacture is advantageously provided.

It is particularly preferred that the deformation element and/or the fibre reinforcement comprises carbon non-woven fabric. Carbon non-woven fabrics are in particular non-woven fabrics comprising carbon fibres. Carbon non-woven fabrics are preferably used unidirectionally and/or biaxially for the manufacture of high-strength components in motor sports, in the generation of wind energy, in sports equipment construction and in boat, ship and/or aircraft construction and comprise in particular stretched (long and/or aligned) fibres which are laid in different layers with different fibre alignments and e.g. connected to a seam thread. In this case, pulling and/or pressing forces can be absorbed and/or transferred surprisingly optimally through the fibres. Non-woven fabrics are particularly preferred for large-scale industrial manufacture where they can be used particularly easily and cost-effectively. In this case, e.g. in the case of manufacture, a so-called autoclave can be used, which is particularly economical in the case of large-scale industrial manufacture and prevents air pockets due to the processing of the woven fabrics under vacuum conditions and thus increases the quality and minimises maintenance.

(Textile) non-woven fabrics in particular comprise one or a plurality of layers of fibres in the same or different orientation (unidirectional or multi-axial non-woven fabrics). The fibres can preferably be connected by threads (also called knitting threads). Structural elongations can be avoided due to the alignment of the fibres in a stretched and/or load-optimised manner. As a result, the mechanical properties are significantly improved. The following stitch types can preferably be used: Pillar, offset pillar, tricot, double tricot and/or hexagonal stitch. These non-woven fabrics are particularly practical during processing.

It is known to the average person skilled in the art that the term "layer" in connection with the plied structure of textile non-woven fabrics or woven fabrics is to be understood as a synonym for the term a "ply". Therefore, throughout the entire document, both terms are interchangeable with one another in this context.

Accordingly, a non-woven fabric preferably comprises a plurality of layers of fibres in the same or different orientation (unidirectional or multi-axial non-woven fabrics) or, in other words, a non-woven fabric particularly preferably comprises a plurality of Rgs of fibres in the same or different orientation (unidirectional or multi-axial non-woven fabrics).

The fibre orientation or alignment in a non-woven fabric is preferably determined according to the production direction of the non-woven fabric. The production direction of a non-woven fabric here preferably defines a 0° direction. The fibre orientation of the respective plies of a non-woven fabric is arranged as a function of this direction. The alignment of the fibre orientation of the individual plies is indicated at an angle to the production direction (see FIG. 13).

Single-ply, uniaxial non-woven fabrics are preferably present, in which the fibre orientation is aligned both in the 0° direction and in the 90° direction. These non-woven fabrics are preferably consolidated directly with mats or non-woven materials. Two-ply, biaxial non-woven fabrics are particularly preferably also still present. The alignment of the fibres here is present preferably in the 0° and 90° (but for example also +45°/−45°) to the production direction. The use of multi-ply, multi-axial non-woven fabrics with a fibre alignment of e.g. 90°, −45°, 0°, +45° (four-ply) is more preferred. In particular, non-woven fabrics with other orientation conditions are also preferred. As a result, the non-woven fabric can advantageously be adapted to the special loading conditions of the safety cabin and withstand such conditions. Due to the low thickness of a ply, multi-layered, multi-axial non-woven fabrics are particularly advantageously weight and space saving.

Unidirectional non-woven fabrics preferably comprise carbon fibres and glass fibres. Stitching can comprise e.g. a polyester yarn or be carried out by a single or double-sided mesh fixing. Taking into consideration the surface density and/or the costs, medium to high filament counts (numbers of filaments) can be included. Such non-woven fabrics are surprisingly versatile. The following properties can preferably be included: Fibre orientation: 0, +−45°, 90°; weight fibre layer (g/m$^2$): 154, 226, 307, 451, 462, 614; surface density total (g/m$^2$): 80, 100, 125, 150, 179, 178, 181, 200, 253, 300, 332, 331, 338, 478, 492, 500, 600, 646; different binder types, e.g. E214; sewn and/or fixed by a one and/or two-sided mesh.

Biaxial carbon fibre non-woven fabrics are preferably used, comprising fibres (in particular rovings) with two layers with two orientations, e.g. ±45°. Due to the stretched fibres included, non-woven fabrics surprisingly comprise improved mechanical properties. In particular when using high-value carbon fibres with e.g. 50,000 (50 k) filaments, the desired safety properties are synergistically improved. Such non-woven fabrics can be treated surprisingly easily during manufacture, can in particular be easily infused by a resin and can be draped better, in this case surprisingly light, rigid and strong. These properties can be achieved with surprisingly low material use and manufacturing effort. The following properties can preferably be included: Fibre orientation: +−45°; weight fibre layer (g/m$^2$): 154 per layer/direction, 154/307 (different directions), 200 per layer, 300 per layer; surface density total (g/m$^2$): 318, 471, 415, 615; sewn (E214).

In a further configuration of the invention, the safety cabin is characterised in that the plastic woven fabric and/or non-woven fabric is a hybrid woven fabric and/or non-woven fabric which comprises a mixed fibre reinforcement made of carbon fibres and aramide fibres. Hybrid woven fabrics and/or non-woven fabrics comprise particularly advantageous material properties in relation to modulus of elasticity, elongation at break and tensile or compressive strength.

In a further preferred embodiment, the safety cabin is characterised in that the fibre reinforcement of the hybrid woven fabric and/or non-woven fabric is included with a weight proportion of between 40% and 60% and in particular roughly 50% aramide fibres, with carbon fibres also being included and with the weight proportions relating to the total weight of the fibre reinforcement. In particular in the case of this composition, it has surprisingly been shown that the processing and/or further treatment of the hybrid woven fabric and/or non-woven fabric is made possible in a simple manner. Additionally, the material properties in this composition are surprisingly advantageous at an optimum in relation to modulus of elasticity, elongation at break and tensile or compressive strength.

In a further preferred embodiment, the fibre reinforcement of the hybrid woven fabric and/or non-woven fabric preferably comprises a volume proportion of between 40% and 60% and in particular roughly 50% aramide fibres, with carbon fibres also being included and with the volume proportions relating to the total volume of the fibre reinforcement.

According to the invention, the walls of the safety cabin preferably comprise at least one layer of a fibre-reinforced plastic woven fabric and/or non-woven fabric. In this context, different woven fabric and/or non-woven fabrics can generally be connected (laminated) together, whereby they are combined as a plurality of layers of non-woven fabrics. The expression "at least one layer of a fibre-reinforced plastic woven fabric and/or non-woven fabric" means the same as "at least one [in the context of the number] fibre-reinforced plastic woven fabric and/or non-woven fabric". This applies accordingly to all statements in the entire document.

In a further preferred embodiment of the invention, the safety cabin is characterised in that in the layer in the front region of the cabin, a hybrid woven fabric and/or non-woven fabric is included, which
  i. comprises four plies, wherein the fibre orientations of the plies following one another each differ by an angle of 30° or
  ii. comprising six plies, wherein the fibre orientations of the plies following one another each differ by an angle of 18° or
  iii. comprising seven plies, wherein the fibre orientations of the plies following one another each differ by an angle of 15°.

Such a configuration advantageously brings about a particularly surprisingly high stability of the front region of the cabin.

In a further preferred embodiment of the invention, the safety cabin is characterised in that in the layer in the front region of the cabin, a hybrid woven fabric and/or non-woven fabric is included, which
  i. comprises preferably 1 to 10, particularly preferably 2 to 6 and in particular 2 plies, wherein the fibre orientations of the plies following one another each differ by an angle of roughly 90° or ii. comprises preferably 1 to 12, particularly preferably 3 to 9 and in particular 3 plies, wherein the fibre orientations of the plies following one another each differ by an angle of roughly 45°.

In a preferred embodiment, the layer in the front region of the cabin, in which a hybrid woven fabric and/or non-woven fabric is included,
   i. comprises preferably 2 to 12, particularly preferably 3 to 8 and in particular 4 plies, wherein the fibre orientations of the plies following one another each differ by an angle of roughly 30° or
   ii. comprises preferably 2 to 12, particularly preferably 4 to 8 and in particular 6 plies, wherein the fibre orientations of the plies following one another each differ by an angle of roughly 18° or
   iii. comprises preferably 2 to 14, particularly preferably 4 to 9 and in particular 7 plies, wherein the fibre orientations of the plies following one another each differ by an angle of roughly 15°.

According to the invention, a fibre-reinforced plastic woven fabric and/or non-woven fabric or a layer of a fibre-reinforced plastic woven fabric and/or non-woven fabric preferably comprises 4 plies, with the fibre orientation of a first ply preferably comprising an angle of 0°, a second ply comprising an angle of 30°, a third ply comprising an angle of 60° and a fourth ply comprising an angle of 90° to the production direction of the woven fabric and/or non-woven fabric.

In a further preferred variant, a fibre-reinforced plastic woven fabric and/or non-woven fabric or a layer of a fibre-reinforced plastic woven fabric and/or non-woven fabric preferably comprises six plies, with the fibre orientation of a first ply preferably comprising an angle of 0°, a second ply comprising an angle of 18°, a third ply comprising an angle of 36°, a fourth ply comprising an angle of 54°, a fifth ply comprising an angle of 72° and a sixth ply comprising an angle of 90° to the production direction of the woven fabric and/or non-woven fabric.

In a further preferred variant, a fibre-reinforced plastic woven fabric and/or non-woven fabric or a layer of a fibre-reinforced plastic woven fabric and/or non-woven fabric preferably comprises seven plies, with the fibre orientation of a first ply preferably comprising an angle of 0°, a second ply comprising an angle of 15°, a third ply comprising an angle of 30°, a fourth ply comprising an angle of 45°, a fifth ply comprising an angle of 60°, a sixth ply comprising an angle of 75° and a seventh ply comprising an angle of 90° to the production direction of the woven fabric and/or non-woven fabric.

In a further preferred embodiment of the invention, the safety cabin is characterised in that in the layer in the rear region of the cabin, a hybrid woven fabric and/or non-woven fabric is included, which
   i. comprises two plies, with the fibre orientations of the plies following one another each differing by an angle of 90° or
   ii. comprises three plies, with the fibre orientations of the plies following one another each differing by an angle of 45°.

In a preferred embodiment, the layer in the rear region of the cabin, in which a hybrid woven fabric and/or non-woven fabric is included,
   i. comprises preferably 1 to 10, particularly preferably 2 to 6 and in particular 2 plies, wherein the fibre orientations of the plies following one another each differ by an angle of roughly 90° or
   ii. comprises preferably 1 to 12, particularly preferably 3 to 9 and in particular 3 plies, wherein the fibre orientations of the plies following one another each differ by an angle of roughly 45°.

In a preferred embodiment, the layer in the rear region of the cabin, in which a hybrid woven fabric and/or non-woven fabric is included,
   i. comprises preferably 2 to 12, particularly preferably 3 to 8 and in particular 4 plies, wherein the fibre orientations of the plies following one another each differ by an angle of roughly 30° or
   ii. comprises preferably 2 to 12, particularly preferably 4 to 8 and in particular 6 plies, wherein the fibre orientations of the plies following one another each differ by an angle of roughly 18° or
   iii. comprises preferably 2 to 14, particularly preferably 4 to 9 and in particular 7 plies, wherein the fibre orientations of the plies following one another each differ by an angle of roughly 15°.

Such a configuration advantageously brings about high stability of the rear region of the cabin, with material advantageously being saved in relation to the front region and therefore costs advantageously being lowered. Additionally, the rear region, in particular in the case of collisions at the rear (accidents where a vehicle drives into the tail of the mobile home or motor home), the function of a crumple zone or deformation zone, which can absorb impact energy and convert it such that less kinetic impact energy arrives to the passengers. The passengers preferably sit in the front region of the safety cabin and/or in the driver compartment.

According to the invention, a fibre-reinforced plastic woven fabric and/or non-woven fabric or a layer of a fibre-reinforced plastic woven fabric and/or non-woven fabric preferably comprises two plies, with the fibre orientation of a first ply preferably comprising an angle of 0° and a second ply comprising an angle of 90° to the production direction of the woven fabric and/or non-woven fabric.

Alternatively, a fibre-reinforced plastic woven fabric and/or non-woven fabric or a layer of a fibre-reinforced plastic woven fabric and/or non-woven fabric preferably comprises three plies, with the fibre orientation of a first ply preferably comprising a first angle of 0°, a second ply comprising an angle of 45° and a third ply comprising an angle of 90° to the production direction of the woven fabric and/or non-woven fabric.

According to the invention, a multi-layered, multi-axial non-woven fabric (preferably hybrid non-woven fabric) is indirectly manufactured, with a fibre alignment of e.g. 90°, −45°, 0°, +45° (four-ply) by standardised biaxial non-woven fabrics (preferably hybrid non-woven fabrics) in particular with a fibre orientation of 0° and 90°. The biaxial non-woven fabrics are laminated one on top of another in this case. Two 0°/90° non-woven fabrics laminated one on top of another accordingly result in a 0°/−45°/90°/45° non-woven fabric. The manufacture of further multi-layered non-woven fabrics (preferably hybrid non-woven fabrics) is known to the person skilled in the art by laminating standardised biaxial hybrid non-woven fabrics (see also FIG. 12).

It is clear to the average person skilled in the art that all angles mentioned in this document can comprise a certain tolerance range. Accordingly, obvious angles are also included with a deviation of preferably +/−10°, particularly preferably of +/−5° and more preferably +/−2° to the mentioned angles.

In a further preferred embodiment of the invention, the safety cabin is characterised in that each ply of the layer comprises a thickness of roughly 0.3 mm. This saves on materials in an advantageous and surprising manner and is therefore particularly economic.

Similarly, carbon woven fabric can also be included in the deformation element or the fibre reinforcement. The following properties can preferably be included: Materials and properties: Carbon glass woven fabric and/or carbon aramide woven fabric in HAT (high-strength) and/or HM (high modulus); surface density (g/m$^2$): 80, 95, 120, 135, 160, 170, 175, 200, 205, 215, 245, 285, 300, 305, 365, 400, 410, 425, 500, 620, 665, 830; yarn count chain/weft (tex): 70, 200, 400, 800, 1600, 225, 200, 200 carbon/160 aramide; binding type: Canvas, body 2/2 4/4 satin 1/7. The advantage of carbon woven fabrics is the particularly low weight and the low production effort.

Similarly, narrow (size range preferably cm) woven fabric strips can preferably be included in the deformation element and/or its fibre reinforcement, preferably with the following properties: unidirectional; plain weave, preferably with a binding chain/glass auxiliary chain; surface density (g/m$^2$): 140, 200, 210, 270, 280, 285, 290, 330, 360, 365, 370; width (cm): 5, 6.5, 7, 7.5, 4.5, 2.5, 3.5, 10, 12, 16. A particularly flexible reinforcement and increase in safety e.g. at particularly critical locations can be achieved by woven fabric strips, such as e.g. in corner regions of the safety cabin.

Carbon non-woven materials can also preferably be included in the deformation element or the fibre reinforcement. Non-woven materials made of carbon fibres are advantageously very easy to process and are surprisingly suited to prepreg manufacture. Isotropic non-woven materials preferably comprises evenly distributed fibres with a preferred average fibre length of roughly 40 mm. They are particularly cost-effective. Oriented non-woven materials preferably comprise anisotropically aligned fibres with a preferred average fibre length of roughly 60 mm. Oriented non-woven materials can in particular be included in defined carbon fibre non-woven material complexes. The mechanical properties can be surprisingly improved by the layer structure and the orientation. The following properties for an isotropic carbon fibre non-woven material can preferably be included: Proportion of carbon fibre/glass fibre/polymer fibre (g/m$^2$): 410/13/27 (=450 total), 469/13.48 (=530 total). The following properties for an oriented carbon fibre non-woven material can preferably be included: Proportion of carbon fibre/glass fibre/polymer fibre (g/m$^2$): 75/9/12 (=96 total). Preferred properties of a carbon fibre non-woven material complex are: Orientation non-woven material layers: 0, +−45°; proportion of carbon fibre/glass fibre/polymer fibre (g/m$^2$): 150/26/19 (=205 total with binder), 300/35/57 (=402 total with binder).

Carbon fibre wet non-woven materials can preferably also be included. They can preferably comprise the following properties: surface density (g/m$^2$): 20, 30; fibre length (mm): 6/12, tear resistance: N/15 mm; binder type: Polyester styrene-soluble, polyvinyl alcohol. Wet non-woven materials are particularly easy to process and save on resources.

In the case of all fibre reinforcements, recycled fibres can preferably be included. It has particularly advantageously and very surprisingly been shown that in this way a high stability of the reinforcement is achieved in addition to being friendly to the environment.

A safety cabin comprising fibre-reinforced deformation elements, preferably made of CFP, can be manufactured for example as follows: a carbon fibre-reinforced plastic (CFP) is used, comprising carbon fibres comprising a thermoplastic textile fibre made of polyacrylonitrile. This is preferably split up into a thin fibre (approx. 7 micrometers {μm}) comprising substantially pure carbon. Approx. 50,000 fibres are preferably combined to form a roving. The rovings are then preferably further processed into textile non-woven fabrics. In this case, in particular a plurality of layers of non-woven fabrics of different alignments can be included in different orientations in stacks, which are/will be preferably cut to length. These stacks can now be included in parts of the safety cabin (deformation elements). In this case, further individual shaping is made possible and/or the stability is increased preferably by supplying heat. Joining a plurality of the pre-shaped parts, preferably called pre-form blanks, to form a larger component is preferred. As a result, outlay in the case of manufacture of large-surface components of the safety cabin can be surprisingly improved. In a next step, resin is introduced or injected under high pressure preferably by a RTM process (pressure preferably more than 1 bar, more preferably more than 10 bar and in particular 50 bar or more), e.g. in a suitable mould. As a result, the rigidity can be surprisingly improved. The resulting CFP elements are then preferably joined to form a safety cabin or a base structure including such, comprising deformation elements. Advantageously, many components and therefore weight can be saved, compared to a conventional cabin of a mobile home or motor home, through the described manufacture of complex and preferably large-surface parts with an improved geometric integration. The CFP elements can preferably be joined by adhesion, whereby the strength can be improved and weight can be saved. In the case of the manufacture of the safety cabin as described, weight can be saved (with increased safety) and therefore resources saved. Similarly, the elements used are preferably corrosion free, whereby the safety cabin is particularly low-maintenance and long-lasting. The elements are particularly preferably insensitive to light impacts. The elements can preferably also be painted in order to form the external region of the cabin and enhance the aesthetic. In this case, surprisingly less paint can be used advantageously due to the unnecessary corrosion protection and it can be applied in a more energy-saving way. This is friendly to the environment and saves resources.

In general, the number of preferred layers or plies of a fibre reinforcement is calculated by means of the so-called lamination theory. Thus, a preferred strength and conversion of kinetic energy through a fibre-reinforced deformation element can be particularly easily calculated.

Individual layers or plies preferably comprise a thickness here of <1 mm. Therefore, weight can be saved. The thickness of individual layers or plies is particularly preferably roughly 0.2 mm. Such layers are particularly space saving and economical.

In a preferred embodiment, the safety cabin is characterised in that the fibre reinforcement is selected from the group comprising carbon fibres, aramide fibres and/or glass fibres. They are particularly low-maintenance, robust and light. Elements with such fibre reinforcements are preferably 3 to 6 times, in particular 5.4 times more stable than a steel element of the same weight. In particular, the fine dust development during the manufacture and use of CFP is unproblematic, which is favourable to the health of the workers involved and the environment.

In a further preferred embodiment, a polyester resin is used for a matrix formation for the fibre reinforcements for a fibre-reinforced plastic. This is particularly cost-effective. In particular, epoxy resin is used, this is particularly high-performing and forms improved components.

In a preferred embodiment, the fibre reinforcement comprises fibre rovings, with the fibre rovings comprising a filament count of between 1,000 and 50,000 and/or a fineness of between 30 and 3,500 tex, preferably of between 40 and 400 tex. In this manner, the preferred safety properties can be particularly easily achieved.

In a further preferred embodiment of the safety cabin, the deformation element can comprise glass fibre-reinforced plastic. This is particularly cost-effective.

In a further preferred embodiment of the invention, the deformation element comprises a mixed fibre reinforcement with a weight proportion of aramide fibres of between 10% and 90%, preferably of between 20% and 80%, particularly preferably of between 30% and 70%, more preferably of between 40% and 60% and in particular roughly 50%, with carbon fibres also being included. It was very surprising that such a deformation element comprises improved safety properties, without contributing additional weight. As a result, resources are saved, additionally a cost saving results in combination with the similarly surprising freedom from maintenance.

In a further preferred embodiment, the deformation element comprises a carbon non-woven fabric. As a result, the quality is increased.

In a further preferred embodiment of the invention, the external region of the safety cabin comprises at least one deformation element comprising a layer of a carbon and/or aramide fibre-reinforced plastic woven fabric and/or non-woven fabric. Thus, the excellent safety and weight properties of these elements can be particularly easily utilised.

In this and the embodiments mentioned below, a layer of a carbon and/or aramide fibre-reinforced plastic woven fabric can preferably also be replaced with a layer comprising a metal foam or can comprise such a layer. If, e.g. 3 to 8 layers of a carbon and/or aramide fibre-reinforced plastic woven fabric are mentioned below, 3 to 8 layers of a metal foam can also be meant or mixed layers, e.g. when mentioning 8 layers of a carbon and/or aramide fibre-reinforced plastic woven fabric, 3 layers of a carbon and/or aramide fibre-reinforced plastic woven fabric and 5 layers comprising metal foam can be meant.

The same applies preferably to the layer of a glass fibre-reinforced plastic, which can preferably analogously also comprise a layer of a metal foam.

In a further preferred embodiment of the invention, the external region of the safety cabin comprises at least one deformation element comprising between 1 and 20, preferably 3 to 8 layers of a carbon and/or aramide fibre-reinforced plastic woven fabric and/or non-woven fabric. Thus, surprisingly flexible deformations elements can be formed. In this case, it is in particular preferred that different layers comprise at least two different orientations of the fibres and/or fibre rovings. Thus, the safety can be surprisingly increased.

In a further preferred embodiment of the invention, the external region of the safety cabin comprises at least one deformation element comprising at least one layer of glass fibre-reinforced plastic (GFP) with a thickness of between 1 and 10 mm, preferably of between 1 and 5 mm. Preferably, in the case of the preferred thicknesses, more than one layer of GFP is included. As a result, not only can the safety preferably be improved, even with respect to minor accidents, by providing a large crumple zone, but also surprisingly the comfort of the safety cabin can be improved by better sound or thermal damping. The person skilled in the art knows that greater thicknesses than those preferred may result in the corner regions of the cabin, in which preferably fibre-reinforced layers overlap to improve the stability and/or strength.

In a preferred embodiment, the safety cabin is characterised in that the walls of the safety cabin comprise at least two layers of a fibre-reinforced plastic woven fabric and/or non-woven fabric, with a foam material layer preferably being positioned between the layers.

Advantageously, the damping property and the stability of the safety cabin is improved as a result. Additionally, the foam material ply acts positively on the heat damping of the safety cabin.

In a preferred embodiment, the fibre-reinforced plastic woven fabric and/or non-woven fabric is a hybrid woven fabric and/or non-woven fabric.

According to the invention, the external walls of the safety cabin are in particular divided in the cross-section preferably into three sections: One outer cover layer, in relation to the safety cabin, one inner cover layer, in relation to the safety cabin, and one hard foam ply arranged between both cover layers. The cover layer comprises at least one layer of a hybrid woven fabric and/or non-woven fabric, which comprises a plurality of plies (or also meaning at least one non-woven fabric which comprises a plurality of plies).

In a further embodiment of the invention, the cover layer also comprises particularly preferably two plies of GFP. The two plies of GFP each surround from one side preferably the hydride woven fabric and/or non-woven fabric in the cover layer. The fibre orientation of the GFP preferably comprises an angle of 0° and/or 90° in relation to the production direction and/or particularly preferably in relation to the fibre orientation of the attached ply of the hybrid woven fabric and/or non-woven fabric in the cover layer (see also FIG. 11a, 11b, 11c).

In some statements in this document, the cover layer is preferably also written as layer for short. The person skilled in the art can in this case conclude from the context whether it concerns a ply of a woven fabric and/or non-woven fabric or a woven fabric or non-woven fabric as a whole and/or whether it concerns a plurality of combined woven fabrics or non-woven fabrics (cover layer).

In a further preferred embodiment of the invention, the safety cabin is characterised in that in the layer, two external plies made of glass fibre-reinforced plastic are included, which finish the layer at two opposing external surfaces, with the fibre orientation of each external ply preferably differing by 90° from the ply therebelow and/or the other external ply. The plies of the glass fibre-reinforced plastic advantageously improve the stability of the walls (see FIG. 11a, 11b, 11c).

In a further preferred embodiment, the cover layer preferably comprises 1 to 10 plies of GFP, particularly preferably 1 to 5 plies and in particular 2 plies.

In a further preferred embodiment, the cover layer preferably comprises a plurality of layers of a GFP non-woven fabric and/or woven fabric, comprising preferably 1 to 10 plies, particularly preferably 1 to 5 plies and in particular 2 plies.

In a further preferred embodiment, the cover layer preferably comprises 1 to 10 layers of a GFP non-woven fabric and/or woven fabric, particularly preferably 2 to 5 and in particular 2 layers.

An external region can preferably also comprise metal foam instead of the external preferred GFP, in addition to a particular effect for the safety, even for third parties involved in an accident, a particular aesthetic effect can also be achieved.

In a further preferred embodiment of the invention, a front (passenger) region of the cabin comprises 2 to 5 times as many layers of a carbon and/or aramide fibre-reinforced plastic woven fabric and/or non-woven fabric as a rear region, with a front region preferably comprising 2 to 10 layers, in particular 5 layers and a rear region 1 to 2 layers, in particular 2 layers of a carbon and/or aramide fibre-reinforced plastic woven fabric and/or non-woven fabric. The passengers preferably remain in a front region of the cabin during the journey, where the seats are in particular installed. The functional equipment of the mobile home or motor home, in particular bathroom and/or kitchen, is preferably included in a rear region. In this case, it is advantageous to construct the rear region fixedly or stably, but less so than a front passenger region such that the rear region, in particular in the case of collisions to the rear, forms a crumple zone or "sacrificial anode", which can absorb and convert impact energy such that less kinetic impact energy reaches the passengers. In this case, they are themselves protected by using a plurality of layers like in a "safety cage". In this case, in addition to the advantageous safety properties, a weight saving of the safety cabin also advantageously results which saves resources and costs.

In a further preferred embodiment of the invention, a front (passenger) region of the cabin comprises a hybrid woven fabric and/or non-woven fabric with 2 to 5 times as many plies as a hybrid woven fabric and/or non-woven fabric in the rear region (intermediate wall to vehicle tail) of the cabin, with a hybrid woven fabric and/or non-woven fabric in the front region (vehicle column to intermediate wall) comprising preferably 1 to 9 plies, particularly preferably 4 to 7 plies, in particular preferably 5 plies and in the rear region preferably 1 to 5 plies, in particular preferably 2 plies.

In a further preferred embodiment of the invention, the external region of the safety cabin comprises a foam material. A foam material can e.g. be an extruded polystyrene in the form of a hard foam, but also comprise other foaming materials, for example polyols and polyisocyanates from which, in a polyaddition reaction, foam material made of polyurethane (PUR) develops. It was surprising that by using foam material in the external region of a safety cabin not only could its comfort properties be improved through thermal and/or sound damping, but the safety properties can also be improved, in particular by providing a crumple zone and/or a ply, which can convert the energy of an impact during an accident into forms of energy that are not harmful to passengers.

In a further preferred embodiment of the invention, the safety cabin is characterised in that the walls of the safety cabin comprise at least one foam material, preferably a hard foam, in particular extruded polystyrene hard foam (XPS). Polystyrene hard foam (XPS) is advantageously extremely strong and has a high dimensional stability.

In a preferred configuration of the invention, the hard foam is arranged between the inner cover layer and the outer cover layer. The hard foam in particular comprises a ply thickness of preferably 10 mm to 60 mm, particularly preferably a ply thickness of 20 mm to 50 mm, more preferably of 25 mm to 35 mm and in particular of roughly 30 mm.

In a further preferred embodiment, the safety cabin is characterised in that the foam material layer comprises a hard foam material and comprises a thickness of roughly 30 mm. Surprisingly, the thickness of roughly 30 mm has in particular led to a particularly good combination of stable wall structure, very good heat insulation of the safety cabin and efficiency.

In a further preferred embodiment, the safety cabin is characterised in that the two layers of fibre-reinforced plastic woven fabric and/or non-woven fabric comprise a ply structure, which is symmetrical in relation to the fibre orientation, with respect to a symmetry plane lying between the layers.

According to the invention, the symmetry plane extends along the longitudinal axis of a wall.

The symmetrical ply structure in relation to the fibre orientations of the layers in the cross-section of a wall is preferably configured such that the fibre orientations of the respective plies of a first fibre-reinforced plastic woven fabric and/or non-woven fabric is present in a mirror-inverted manner with respect to the fibre orientations of the respective plies of a second fibre-reinforced plastic woven fabric and/or non-woven fabric. The symmetry plane therefore preferably corresponds to a mirror plane (see FIG. 11*a*, 11*b*, 11*c*). Surprisingly, this has led to increased stability of the wall and to improved results in simulated accident processes.

In a preferred embodiment of the invention, a fibre-reinforced plastic (preferably a deformation element) is introduced in the region of a vehicle column of the safety cabin and/or of the mobile home or motor home, in particular in the region of an A, B, C and/or D column. Thus, the stability can be surprisingly effectively increased.

In a preferred embodiment, the at least one deformation element comprises at least one stabilising angular element, preferably in a corner region of the safety cabin. An angular element can e.g. comprise at least two flat elements, which are at an angle to one another. An angular element can also preferably comprise a triangle, which is e.g. introduced in the interior of the cabin into a right-angled corner thereof for stabilisation purposes, with two sides of the triangle for example resting on the inner surfaces of the cabin forming the corners and stabilising these two surfaces as a result. Similarly, other suitable, multi-sided shapes can be used (square, pentagon, hexagon, circular section, etc.), which are suited in particular to stabilising a cabin corner. The angular element and in particular the angle can preferably be adapted to geometric conditions of the structure/the cabin of the mobile home or motor home in order to be introduced at a suitable location. Such angular elements can e.g. be present in the corners of the cabin in order to significantly improve the stability and safety properties. However, they can also preferably be present in other suitable regions. In this case, it was surprising that in particular such angular elements increase the stability and safety to an extent which would not be expected solely by the properties of the angular element itself (synergistic). It was also surprisingly found that in particular angular elements in a corner region of the safety cabin (synergistically) increase the (accident) safety.

In a further preferred embodiment of the invention, the external region of the safety cabin comprises at least one deformation element comprising between 1 and 20, preferably 3 to 8 layers of a carbon and/or aramide fibre-reinforced plastic woven fabric and/or non-woven fabric and at least one layer of glass fibre-reinforced plastic with a thickness of between 1 and 10 mm, preferably of between 1 and 5 mm. Through this combination of layers of different glass fibre reinforcements, synergistic effects result from the respective safety effects of the different woven fabric and/or non-woven fabric types in relation to the stability and conversion capability, i.e. in relation to the safety.

In a further preferred embodiment of the invention, the external region of the safety cabin comprises at least one deformation element comprising at least one carbon and/or aramide fibre-reinforced plastic woven fabric and/or non-woven fabric, which comprises between 1 and 20, preferably 3 to 8 layers or plies and at least one layer of glass fibre-reinforced plastic with a thickness of between 0.1 and 5 mm, preferably of between 0.2 and 0.5 mm. This embodiment shows, in addition to the low costs and the low weight, surprisingly very good properties in regard to the stability.

In a further preferred embodiment of the invention, the external region of the safety cabin comprises at least one deformation element comprising between 1 and 20, preferably 3 to 8 layers of a carbon and/or aramide fibre-reinforced plastic woven fabric and/or non-woven fabric and a foam material. It was surprising that by using a foam material, defective regions of the woven fabric or non-woven fabric could be compensated and therefore defects could be rectified.

In a further preferred embodiment of the invention, the external region of the safety cabin comprises at least one deformation element comprising at least one carbon and/or aramide fibre-reinforced plastic woven fabric and/or non-woven fabric, which comprises between 1 and 20, preferably 3 to 8 layers or plies and a foam material.

In a further preferred embodiment of the invention, the external region of the safety cabin comprises at least one deformation element comprising between 1 and 20, preferably 3 to 8 layers of a carbon and/or aramide fibre-reinforced plastic woven fabric and/or non-woven fabric, at least one layer of glass fibre-reinforced plastic with a thickness of between 1 and 10 mm, preferably of between 1 and 5 mm, at least one layer of glass fibre-reinforced plastic with a thickness of between 1 and 10 mm, preferably of between 1 and 5 mm and a foam material, with a front region of the cabin preferably comprising 2 to 5 times as many layers of a carbon and/or aramide fibre-reinforced plastic woven fabric as a rear part, with a front region preferably comprising 2 to 10 layers, in particular 5 layers and a rear region 1 to 2 layers, in particular 2 layers of a carbon and/or aramide fibre-reinforced plastic woven fabric. By combining these materials and/or layers, the safety could be surprisingly improved. In this case, the properties of these materials surprisingly complement one another, this combination increases the reliability of the cabin and represents a fortunate circumstance. Through the preferred use of different numbers of layer at the front and rear of the safety cabin, a surprisingly improved crumple or deformation zone can be provided in particular in a rear part of the safety cabin.

In a further preferred embodiment of the invention, the external region of the safety cabin comprises at least one deformation element comprising between 1 and 20, preferably 3 to 8 layers of a carbon and/or aramide fibre-reinforced plastic woven fabric and a stabilising angular element, preferably in a corner region of the safety cabin. The layers of the plastic woven fabric and the angular element increase the strength surprisingly and synergistically, i.e. beyond what is expected.

In a further preferred embodiment of the invention, the safety cabin comprises, transversely to the travel direction, at least one transverse beam which preferably comprises at least one stabilising deformation element. The transverse beam preferably comprises fibre-reinforced plastic, in particular the fibre reinforcement comprises carbon fibres, aramide fibres and/or glass fibres. The transverse beam described in this document can preferably also comprise metal foam. These transverse beams can surprisingly increase the stability of the cabin, without themselves contributing much weight. In particular in the case of accidents with lateral impact on the cabin, they can compensate for the crumple or deformation zones, which are usually lower at the side, such that they represent a substantially continuous transverse element which convert kinetic energy into tension energy and deformation energy. In this case, the transverse beam can preferably be housed in a floor region of the cabin, in proximity to the chassis. Such a transverse beam is particularly space-saving. The transverse beam can also preferably be located in front of and/or behind the passengers. Such a transverse beam comprises an improved effectiveness. The transverse beam is preferably connectable to the chassis and/or the rest of the safety cabin.

In a further preferred embodiment of the invention, the safety cabin comprises, longitudinally to the travel direction, in front of and/or behind the passengers, at least one longitudinal beam which preferably comprises at least one stabilising deformation element. The transverse beam preferably comprises fibre-reinforced plastic, in particular the fibre reinforcement comprises carbon fibres, aramide fibres and/or glass fibres. The longitudinal beam described in this document can preferably also comprise metal foam. Even when longitudinal and/or transverse beams made of aramide and/or carbon fibre-reinforced plastic are described in this document, longitudinal and/or transverse beams comprising metal foam may preferably be meant.

If, in this document, a deformation element (angular element, layer, longitudinal beam, transverse beam . . . ) made of carbon and/or aramide fibre-reinforced plastic or another material (e.g. metal foam) is described, the (respective) deformation element comprising carbon and/or aramide fibre-reinforced plastic and/or another material is preferably meant.

It was surprising that not only can the safety of the entire cabin be increased by such a longitudinal beam, but the driving properties are also notably improved due to a preferred higher rigidity of the chassis and/or entire vehicle. In this case, the longitudinal beam can preferably be housed in a floor region of the cabin, in proximity to the chassis. Such a longitudinal beam is particularly space-saving. The longitudinal beam can also preferably be located in front of and/or behind the passengers. Such a longitudinal beam comprises an improved effectiveness. The transverse beam is preferably connectable to the chassis and/or the rest of the safety cabin.

In a further preferred configuration, longitudinal beams can preferably also be arranged above the floor region at the height of the lateral external walls. Transverse beams can also be arranged above the floor region and represent a connection between two lateral external walls.

In an exemplary form of the safety cabin, the entire cabin is preferably laminated with fibre-reinforced layers, preferably made of Sigratex. For example, the structure can be constructed from outside inwards as follows:

2 to 3 mm glass fibre-reinforced plastic (GFP), then 1 to 4 layers aramide and/or carbon fibre-reinforced plastic (preferably Sigratex), then 30 mm foam (preferably XPS), then once again aramide and/or carbon fibre-reinforced plastic (preferably Sigratex) and finally 1 to 2 mm of GFP. The number of layers should, in the region where the passengers remain sitting (preferably at the front), preferably be higher.

Roughly 0.3 mm glass fibre-reinforced plastic (GFP), then 1 to 5 layers aramide and/or carbon fibre-reinforced plastic (preferably Sigratex) or preferably a layer of aramide and/or carbon fibre-reinforced plastic with preferably 4 to 7 plies, then roughly 30 mm foam (preferably XPS), then once again aramide and/or carbon fibre-reinforced plastic (preferably Sigratex) and finally 0.3 mm of GFP. The number of layers and/or plies should, in the region where the passengers remain sitting (preferably at the front), preferably be higher.

The structure in the rear non-seating area is preferably less strongly constructed such that the rear half of the structure is represented by e.g. only one layer of CFP as the sacrificial anode, commonly known as the deformation element. Two carbon rectangular beams are preferably used in the floor of the cabin longitudinally to the travel direction, which, on the one hand, connect the cabin to the chassis, on the other hand however, serve as a deformation element. Transverse to the travel direction, there is preferably in the region of the cabin also 2 to 4 carbon rectangular beams in order to absorb a lateral impact.

In a preferred configuration of the invention, the safety cabin comprises a plurality of regions, particularly preferably two regions. The respective regions are separated from one another by an intermediate wall. The intermediate wall is arranged transversely to the longitudinal direction of the cabin (or transversely to the main travel direction). The intermediate wall preferably extends continuously perpendicular to the floor region of the safety cabin up to the ceiling region of the safety cabin and represents a connection between ceiling and floor region.

The floor region preferably comprises, according to the invention, the vehicle floor. The ceiling region, in contrast, preferably comprises the vehicle roof of the safety cabin.

In a particularly preferred case of two regions, the intermediate wall divides the safety cabin into a front and a rear region in relation to a main travel direction of the safety cabin. Advantageously, the intermediate wall shields the occupants in the front region from flying parts, since in particular functional spaces, such as e.g. the kitchen, which includes many items of equipment, are in particular preferably present in the rear region. Additionally, the intermediate wall significantly increases the stability of the safety cabin. In the case of a lateral impact, the intermediate wall acts as a deformation element and absorbs forces to a significant degree. According to the invention, occupants can therefore remain in the front region of the safety cabin without having to accept losses in terms of their safety in comparison to occupants in the driver compartment.

The front region preferably extends from a vehicle column of the mobile home or motor home to the intermediate wall, with the vehicle column in particular preferably being the A, B, C or D column. The mentioned vehicle columns are known to the person skilled in the art. In a particularly preferred embodiment, the front region of the safety cabin extends from the B column to the intermediate wall. The rear region preferably extends from the intermediate wall to the end or tail of the vehicle.

In a further preferred embodiment, the entire safety cabin or a part thereof is arranged behind the driver compartment, particularly preferably the entire safety cabin or a part thereof is arranged behind the B column.

In a preferred embodiment of the invention, the safety cabin is characterised in that a front and/or a rear region comprises an extension of at least 1.5 m in the longitudinal direction of the safety cabin. In this case, it is clear to the person skilled in the art that the longitudinal direction of the safety cabin corresponds in said case to the main travel direction.

In a further embodiment, the front and/or rear region preferably comprises an extension of 1 to 10 metres, particularly preferably 1 to 6, more preferably 1 to 3 and in particular at least 1.5 metres.

In a preferred embodiment of the invention, the intermediate wall comprises the same constructive features as the external walls in the front region. Using constructive features, the plied composition of the wall is preferably meant. Advantageously, a highly-safe cabin is formed, as a result, in the front region, in which the passengers sit, which is protected equally on all sides. Surprisingly, it has also been shown that advantageously the sound volume of the environmental noises during the journey and during parking is largely reduced inside the front region.

In a preferred configuration of the invention, the intermediate wall is also divided in the cross-section preferably into three sections. In this case, a foam material ply is also surrounded, preferably by 2 cover layers. A cover layer comprises at least one layer of a hybrid woven fabric and/or non-woven fabric (or also meaning at least one non-woven fabric), which
i. comprises four plies, wherein the fibre orientations of the plies following one another each differ by an angle of 30° or
ii. comprises six plies, wherein the fibre orientations of the plies following one another each differ by an angle of 18° or
ii. comprises seven plies, wherein the fibre orientations of the plies following one another each differ by an angle of 15°.

In a preferred embodiment, a cover layer of the intermediate wall comprises at least one layer of a hybrid woven fabric and/or non-woven fabric (or also meaning at least one non-woven fabric), which
i. comprises preferably 2 to 12, particularly preferably 3 to 8 and in particular 4 plies, wherein the fibre orientations of the plies following one another each differ by an angle of roughly 30° or
ii. comprises preferably 2 to 12, particularly preferably 4 to 8 and in particular 6 plies, wherein the fibre orientations of the plies following one another each differ by an angle of roughly 18° or
iii. comprises preferably 2 to 14, particularly preferably 4 to 9 and in particular 7 plies, wherein the fibre orientations of the plies following one another each differ by an angle of roughly 15°.

In a preferred embodiment, a cover layer of the intermediate wall comprises at least one layer of a hybrid woven fabric and/or non-woven fabric (or also meaning at least one non-woven fabric), which
i. comprises preferably 1 to 10, particularly preferably 2 to 6 and in particular 2 plies, wherein the fibre orientations of the plies following one another each differ by an angle of roughly 90° or
ii. comprises preferably 1 to 12, particularly preferably 3 to 9 and in particular 3 plies, wherein the fibre orientations of the plies following one another each differ by an angle of roughly 45°.

In a further embodiment of the invention, the cover layer also comprises particularly preferably two plies of GFP. The two plies of GFP each surround from one side preferably the hydride woven fabric and/or non-woven fabric in the cover layer. The fibre orientation of the GFP preferably comprises an angle of 0° and/or 90° in relation to the production direction and/or particularly preferably in relation to the fibre orientation of the attached ply of the hybrid woven fabric and/or non-woven fabric in the cover layer.

In connection with the representation of the invention, the person skilled in the art recognises that the term intermediate wall is interchangeable with the term partition and both terms are synonymous with one another.

In a preferred embodiment, the interior of the safety cabin comprises at least one partition in the transverse direction which also comprises at least one stabilising deformation element. The transverse direction is in particular defined as transversely to the travel direction. The partition preferably comprises a fibre-reinforced plastic, in particular the fibre reinforcement comprises carbon fibres, aramid fibres and/ or glass fibres. Through such a partition, occupants can in particular be protected from flying items of equipment. The partition of the interior can in this case preferably be continuous or partial. In this case, it is in particular preferred that functional spaces, such as e.g. the kitchen, which includes many items of equipment, are present in the rear region of the partitioned space. At the front is preferably the living area and in particular the passenger region during the journey. Thus, this region can in particular be protected against flying objects in the case of collisions at the rear and/or full braking applications. Surprisingly, the stability and safety of the entire cabin could also be improved by such a partition, in particular in the case of forces acting during an accident, which comprise force components along the direction of the partition.

The partition preferably comprises a door. It is also preferred that this partition is integrated into the exterior of the safety cabin by using angular elements. For example, the partition can be connected by angular elements to the external walls and/or to the chassis.

The partition can in this case preferably consist of carbon fibre-reinforced plastic or include such. Therefore, the partition can itself be a deformation element. Such a partition is particularly light and stable. Similarly, it can be easily and cost-effectively retrofitted and in this case the safety can be surprisingly increased.

The partition preferably comprises angular elements, in particular at connection points to the external walls of the safety cabin. As a result, the safety can be synergistically increased.

In a further preferred embodiment, the interior region of the safety cabin comprises at least one seating area installed counter to the travel direction. It has been found inter alia in the case of crash tests that such seating areas offer a high level of protection in particular for child occupants. Thus, child passengers can usually be protected particularly well against injury, in particular to the cervical spine region, in the case of collisions to the rear and/or full braking applications.

The seating areas can in this case particularly preferably be connected using angular elements and/or a connector to the safety cabin and/or the chassis of a mobile home or motor home. Thus, a particularly stable anchoring of the seating area inside the mobile home and/or motor home can be ensured.

The angular elements described in this document, such as preferably all deformation elements described here, can also comprises metal foam.

In a further preferred embodiment, the safety cabin comprises, between driver compartment and the interior region, at least one deformation element inserted transversely to the travel direction. This deformation element preferably comprises fibre-reinforced plastic, in particular the fibre reinforcement comprises carbon fibres, aramide fibres and/or glass fibres. There is frequently a dangerous bending of the driver compartment or the driver cabin in particular in the case of collisions to the rear. This can be particularly easily prevented in this way and the safety can be increased. Angular elements are also preferably used. A deformation element for example comprises a flat element inserted into regions between driver compartment and interior region transversely to the travel direction, which is preferably connected by at least one angular element to the chassis and/or to at least one external wall of the safety cabin to increase the stability. As a result, surprisingly bending can be particularly easily prevented. A connection of the driver compartment to the chassis and/or to an external wall of the safety cabin is also conceivable with an angular element as the means. It was surprising that through the simple use of at least one deformation element between driver compartment and interior region, the safety can be significantly increased and bending can be prevented. In this case, it was in particular surprising that even the use of small deformation elements, which leave weight, space available and/or functionality of the mobile home or motor home substantially unchanged, is sufficient to achieve the desired effects. They can also be retrofitted particularly easily.

In a further preferred configuration of the invention, the safety cabin is characterised in that the lateral external walls of the cabin comprise beams arranged in a framework-like manner and made of carbon fibre-reinforced plastic profiles, in particular longitudinal and transverse beams, between which the layers of the fibre-reinforced plastic woven fabric are arranged, with the beams preferably being arranged along probable load paths in the case of an accident. This arrangement advantageously offers surprisingly good stability improvements with minimal material outlay. Additionally, this arrangement is advantageously very light.

Beams arranged in a framework-like manner are in particular stressed by normal forces and are connected to one another at their ends in nodal points. Framework-like beams or spatial frameworks are known here to the average person skilled in the art.

According to the invention, a path, on which the forces are directed due to an external loading through the body, is defined as the load path. In the context of the invention, beams arranged in a framework-like manner are therefore preferably integrated along the load paths such that they are present between 2 cover layers of the external wall. In other words, the beams are embedded into the external wall. The terms load path and load path calculations are known to the average person skilled in the art.

In a further embodiment, the beams are preferably arranged such that they divide an external wall in its longitudinal extension. In this case, they divide the entire structure (2 cover layers and the hard foam ply) of the external wall. The different parts of the external wall accordingly represent a connection between the beams. This method advantageously simplifies the construction or the assembly of the safety cabin.

The framework-like beams can preferably be configured both as longitudinal and transverse beams. In a preferred configuration, two beams lie at their common nodal points in relation to one another such that they preferably form an angle of 0° to 360°, and particularly preferably an angle of 0° to 180°.

In a further preferred embodiment, the longitudinal and transverse sides of the safety cabin comprise aluminium round tubes and/or square profiles and/or sheet materials which are welded and/or adhered and/or otherwise stably connected to one another in a longitudinal and cruciform manner. As a result, the most adequate possible protection of the occupants can be ensured in the case of an accident.

In a further preferred embodiment, the aluminium round tubes and/or square profiles and/or sheet materials comprise at least one deformation element. In this case, the aluminium round tubes, square profiles and/or sheet materials themselves are deformation elements and/or comprise such. This can e.g. also mean that the aforementioned elements are reinforced at suitable locations, in particular by carbon fibre-reinforced plastic. Thus, the safety can be synergistically increased. The processing is also particularly simple and the manufacturing costs are favourable.

In a further preferred embodiment, the safety cabin comprises, transversely to the travel direction, in front of and behind the passengers, transverse beams which preferably comprise at least one stabilising deformation element. In this case, the transverse beam can preferably itself also be a deformation element. In this way, further stability can be provided in the constructive design. It was surprising here that such transverse beams synergistically increase the safety.

In a further preferred embodiment, the tubes, profiles, sheets, deformation elements and/or transverse beams comprise wall thicknesses of between 1 mm and 100 mm and/or in at least one direction comprise a length of between 1 cm and 30 metres. These parameters have proven surprisingly suitable for increasing the stability and are easy to establish.

In a further preferred embodiment, the seating area comprises at least one connector, which is constructively incorporated into the safety cabin and is preferably connected to at least one deformation element, one tube, one profile, one sheet and/or one transverse beam. This connection preferably comprises the connection of the connector to the chassis and/or to the external walls of the safety cabin. To this end, angular elements are in particular used. A connector is preferably a base below the seating area for its anchoring and/or raising. The connector preferably itself comprises fibre-reinforced plastic.

In a further preferred embodiment, the safety cabin is characterised in that the interior region comprises at least one seating area installed counter to in particular the main travel direction, with the seating area comprising a carbon fibre-reinforced hybrid woven fabric and/or non-woven fabric, which is preferably directly connected to the chassis.

If a seating area is integrated in this manner in the structure of the safety cabin, a passenger sitting there may be particularly comprehensively protected. A number of synergistic effects are exhibited, in particular in cooperation with the other safety elements disclosed in this document.

In a further preferred embodiment, the safety cabin comprises, at the sides, preferably in at least one region, which has an increased probability of an accident in the form of a lateral impact, tubes, profiles, sheets, transverse beams and/or deformation elements. Thus, the safety can be particularly easily increased. A person skilled in the art knows through tests, statistics and/or theoretical considerations which regions are exposed to an increased probability of accident.

In a further preferred embodiment, the rear part of the safety cabin is designed as a deformation zone and preferably comprises deformation elements. The rear part preferably designates the tail and/or rear regions of the cabin. A deformation zone is often preferably also designated as the crumple zone. In this way, in particular the conversion capability of the deformation zone and/or of the deformation element is taken into account to increase the accident safety. In particular, together with the partition of the cabin, this preferred variant has been found to be surprisingly safe, primarily when the occupants are located in the front part.

It is also preferred to manufacture a constructive structure such that it provides the most adequate possible protection for the occupants against the consequences of any accident. The construction of the safety cells integrated in the structure is based on the size, application and use (number of occupants) and is therefore not standardised, i.e. the number and length of the individual deformation elements, cross and/or longitudinal connectors is different for each structure. The structure can consist, fully or as a material matrix, of aluminium tubes, aluminium square, carbon fibre (CFRP) or carbon fibre-reinforced plastic, glass fibre or glass fibre-reinforced plastic or other suitable materials, which are welded, laminated and/or adhered e.g. in a mesh-like manner. A structure made of materials such as e.g. CFP, GFP, PU, aluminium sheets or honeycomb sheets is then built around the frame. This construction ensures high stability with lowest possible weight. Through the deformation elements to be joined at the, depending on the mobile home structure, at different points of the construction, the impact energy of another vehicle is deflected in suitable directions and regions of the body and the occupants protected as a result (conversion capability).

In a preferred configuration of the invention, a chassis is arranged behind the driver compartment and is fixedly connected thereto. In particular, the chassis is arranged behind the B column. In this case, according to the invention, the chassis preferably replaces the conventional lead frame of a mobile home or motor home used in the state of the art.

In a further embodiment of the invention, the safety cabin is characterised in that a chassis of the safety cabin is included, with the chassis comprising:
- at least one foamed profile comprising hybrid woven fabric and/or non-woven fabric as the longitudinal and/or transverse beam;
- at least one panel including hybrid woven fabric and/or non-woven fabric to form a preferably aerodynamic cladding of the regions of the chassis not included by the profiles;
- at least one layer of the hybrid woven fabric and/or non-woven fabric.

Such a chassis comprises particularly advantageous properties in relation to the safety of the mobile home and motor home, surprisingly without negatively affecting the driving behaviour. Additionally, the construction of such a chassis is particularly low-weight such that it particularly preferably fulfils the purpose of a lightweight chassis. According to the invention, the chassis comprises the supporting elements of the mobile home or motor home. The supporting elements have in this case preferably the function of supporting the drive, body and the payload and of stabilising against external force effects. A chassis is known to the average person skilled in the art.

In the context of the invention, the foamed profiles are formed as elongated hollow bodies. In the external geometry, the profiles are preferably formed round and/or square. The hollow space of the profiles preferably comprises a hard foam, in particular extruded polystyrene hard foam (XPS). Advantageously, foamed components have not only excellent damping properties, with simultaneous weight reduction, but also act surprisingly positively on the stability of the profiles.

According to the invention, a hybrid woven fabric and/or non-woven fabric is preferably attached to the outwardly directed surface of the hollow profiles. This acts advantageously positively on the stability of the profiles.

In a preferred embodiment of the safety cabin, the foamed profiles are preferably configured as transverse beams, particularly preferably as longitudinal beams. In a further alternative according to the invention, the foamed profiles are preferably formed as both transverse beams and as longitudinal beams.

According to the invention, a panel is defined as a flat element. A panel can adopt any desired geometry. Panels are preferably formed as polygons, particularly preferably the panels are formed as rectangles.

In a further preferred embodiment of the invention, the panels are connected over their whole area to the chassis. The beams of the chassis are preferably connected and clad over their whole area.

In a further preferred embodiment, the panels are attached in the regions of the chassis, which are not included by the profiles of the chassis such that they act as aerodynamic cladding. A good flow resistance coefficient (drag coefficient [$c_w$-Value]) of the underside of the vehicle advantageously emerges from such an arrangement of the panels.

In a further preferred embodiment, the panels represent a connection between the different profiles, therefore the beams of the chassis are connected to one another flat via panels.

In one embodiment, hybrid woven fabrics and/or non-woven fabrics are preferably arranged over their whole area in the entire vehicle. Particularly preferably, the hybrid woven fabric and/or non-woven fabric assumes a supporting function in the region of the chassis.

In a further preferred embodiment, at least one layer of the hybrid woven fabric and/or non-woven fabric is attached over its whole area on the panels. Advantageously, the stability of the chassis can be increased as a result.

In a further embodiment of the invention, the safety cabin is characterised in that the chassis comprises, in a lateral edge region at least in sections along the circumference, at least one deformation element, preferably comprising a honeycomb structure made of carbon fibre-reinforced plastic and/or at least one foamed profile comprising hybrid woven fabric and/or non-woven fabric, with the deformation element preferably being present with at least one panel.

According to the invention, the honeycomb structure is preferably configured in a so-called sandwich construction. Thus, the honeycomb structure preferably consists of a honeycomb core and supporting covering skins. The covering skins preferably consist of at least one layer of the hybrid woven fabric and/or non-woven fabric and/or can be attached to structural elements of the safety cabin. The honeycomb core in this case preferably consists of prisms with a hexagonal base surface made of carbon fibre-reinforced plastic. The prisms are preferably arranged in connection with one another along their external surfaces and as a result provide the honeycomb structure known to the person skilled in the art. Surprisingly, the thermal insulation of the safety cabin is also improved, in addition to the improved stability of the safety cabin.

In a further preferred configuration of the honeycomb structure, the honeycomb core is attached without covering skins directly on structural elements of the safety cabin. The "omission" of the covering skins advantageously saves material and surprisingly still fulfils all stability criteria of the safety cabin.

In a further preferred embodiment, a honeycomb structure made of carbon fibre-reinforced plastic is attached on a transverse beam preferably along the circumference. The top surface of the entire transverse beam is therefore configured with the honeycomb structure. The honeycomb structure is preferably attached without and/or particularly preferably with covering skins on the transverse beam.

In a further preferred configuration of the invention, a honeycomb structure is introduced on the longitudinal side into the panels. The honeycomb structure is preferably included without and/or particularly preferably with covering skins in the panels.

According to the invention, a lateral edge region is preferably a region of the chassis and/or the safety cabin, which, in the top view of the safety cabin, preferably does not run over the centrally located longitudinal axis of the chassis and/or the safety cabin. An edge region is preferably positioned, in the top view, in proximity to an external wall. The proximity to an external wall is here preferably a distance from an external wall of 0 mm up to roughly half the stretch from the external wall to the centrally located longitudinal axis of the chassis and/or the safety cabin.

In a further embodiment of the invention, the safety cabin is characterised in that the chassis comprises at least one rear axle and/or at least one drive unit.

In a further preferred configuration, the chassis comprises two rear axles.

According to the invention, the drive unit is a constructive unit, which sets into motion the mobile home or motor home by means of energy conversion. In the context of the invention, this is preferably an engine with or without a transmission.

The drive is preferably configured as a hybrid drive, electric drive and/or as a combustion power drive.

Combustion power drives or combustion engines are known to the average person skilled in the art. In a combustion chamber, an ignitable mixture of fuel and air is burned. The thermal expansion of the thus resulting hot gas is used to move pistons (in the case of a Wankel engine, rotors).

Electric drives convert electric energy into mechanical energy. It is known to the person skilled in the art that current-carrying conductor coils generate magnetic fields in electric motors, whose mutual attractive and repulsive forces are converted into movement.

According to the invention, the electric energy is preferably provided by batteries or accumulators, fuel cells and/or photovoltaic cells.

A hybrid drive is preferably a combination of an electric drive and a combustion drive. The electric or combustion engines can, according to the invention, interact differently. It is known to the person skilled in the art that the electric drive and the combustion drive cooperate in parallel, serially or by means of a mixed form.

In a further embodiment of the invention, the safety cabin is characterised in that the safety cabin comprises at least one battery, at least one fuel cell and/or at least one water tank, with battery, fuel cell and/or water tank preferably being housed in a protective box in the front and/or rear region of the cabin.

A water tank stores water and is preferably used for the use of sanitary systems and kitchen in a mobile home and motor home. Both a battery (galvanic cell) and a fuel cell deliver power to an electric motor, or also to other electric components of a mobile home and motor home, such as for example flow heaters, TV device, heating system, etc. Both galvanic cells and fuel cells are known to the person skilled in the art, with a hydrogen tank being essential for a fuel cell. In particular in the case of accidents, the water tank, the hydrogen tank, the battery and/or the fuel cell must be well protected. Advantageously, this is provided by the protective box. The protective box is preferably arranged in the front and/or in the rear region of the safety cabin. More preferably, the protective box is housed in the front region of the cabin.

In a further embodiment of the invention, the safety cabin is characterised in that the protective box is delimited externally at least in sections by at least one deformation element, which in particular comprises a honeycomb structure made of carbon fibre-reinforced plastic and/or at least one foamed profile comprising hybrid woven fabric and/or non-woven fabric, with the protective box preferably being connected to a longitudinal and/or transverse beam.

The protective box is preferably configured such that it is surrounded from two sides each by a longitudinal beam comprising preferably a honeycomb and/or from two further sides each by a transverse beam. Particularly preferably, two sides are each surrounded by a longitudinal beam and/or at least one further side by a transverse beam.

In a further embodiment, the longitudinal axis of the protective box is preferably parallel to the main travel direction. Particularly preferably, the longitudinal axis of the protective box is, in its height, displaced parallel from the longitudinal axis of the safety cabin and/or of the chassis such that the protective box is advantageously embedded centrally in the safety cabin and is enclosed by a plurality of protective components.

In a further embodiment, the longitudinal axis of the protective box preferably has roughly the same distance to both lateral external walls of the safety cabin.

In a further preferred configuration, the protective box is connected to a longitudinal and/or transverse beam of the chassis.

In a further preferred embodiment, the protective box is configured such that the region to be protected is surrounded by a frame or a framework-like structure of longitudinal and transverse beams, which are connected to the beams of the chassis.

In a further preferred embodiment, the longitudinal axis of the protective box is arranged transversely to the main travel direction. In this way, the safety cabin can advantageously be constructed to be smaller in its longitudinal extension.

In a further embodiment of the invention, the safety cabin is characterised in that the safety cabin comprises furniture, in particular at least one seating area, a bench, a cupboard and/or bathroom-partition wall, with the furniture, observing load path calculations, being fixedly connected by a fibre-reinforced plastic to the chassis and/or to the safety cabin.

All furniture preferably comprises a hybrid woven fabric or non-woven fabric such that it can advantageously adopt the function of a crash element, in addition to its original function. The furniture preferably comprises 45°/90° hybrid woven fabric or non-woven fabric.

In a further aspect, the invention relates to a manufacturing method for a safety cabin for a mobile home or motor home comprising at least one part of the safety cabin arrangeable behind a driver compartment, comprising the manufacture of a layer of a fibre-reinforced plastic woven fabric and/or non-woven fabric for a wall of the safety cabin, characterised in that a plurality of plies of a fibre-reinforced plastic woven fabric and/or non-woven fabric are laminated to form the layer, with the plies being arranged in the transverse direction of the layer, with plies directly following one another comprising different fibre orientations with respect to one another, with the layer of a lateral external wall for a front region of the cabin, in relation to an anticipated travel direction, comprising at least three to nine plies, with the layer of a lateral external wall for a rear region of the cabin, in relation to the intended travel direction, comprising one to five plies, with more plies being included in the front region than in the rear region and with a layer intended for an intermediate wall in the transverse direction of the cabin comprising three to nine plies.

In a preferred embodiment of the invention, the manufacturing method also comprises the following steps:
laminating two external plies made of glass fibre-reinforced plastic onto the layer, which finish the layer at two opposing external surfaces, with the fibre orientation of each external ply preferably differing by 90° from the ply therebelow and/or the other external ply.

In a further preferred embodiment of the invention, the manufacturing method also comprises the following steps:
Connecting at least two layers of a fibre-reinforced plastic woven fabric and/or non-woven fabric to a wall or to a wall region of the safety cabin, with a foam material layer preferably being positioned between the layers, with the two layers of the fibre-reinforced plastic woven fabric and/or non-woven fabric, in relation to the fibre orientation, comprising a symmetrical ply structure with respect to a symmetry plane located between the layers.

In a further preferred embodiment of the invention, the manufacturing method also comprises the following steps:
Connecting a wall or a wall region of the front region with a wall or a wall region of the rear region to a lateral external wall or to a wall region of a lateral external wall;

In a further preferred embodiment of the invention, the manufacturing method comprises the manufacture of a chassis of the safety cabin and also the following steps:
Providing at least one foamed profile comprising hybrid woven fabric and/or non-woven fabric for a longitudinal and/or transverse beam;
Preferably connecting longitudinal beam and transverse beam
Preferably aerodynamic cladding of the regions of the chassis, not included by the profiles, with at least one panel including hybrid woven fabric;
Preferably inserting at least one layer of the hybrid woven fabric and/or non-woven fabric.

In a further aspect, the invention relates to a manufacturing method for a safety cabin according to any one or a plurality of the preceding claims, comprising the following steps for the structure of the external region from the outside inwards:
preferably inserting a layer of GFP and/or a metal foam, preferably with a thickness of 1 to 10 mm, preferably 2 to 3 mm;
inserting 1 to 20 layers, preferably 2 to 8 layers of a carbon and/or aramide fibre-reinforced plastic woven fabric and/or a metal foam;
preferably introducing a ply of XPS foam, preferably with a thickness of between 10 mm and 40 mm, in particular 30 mm;
preferably introducing at least one further layer of a carbon and/or aramide fibre-reinforced plastic woven fabric and/or a metal foam;
lastly preferably inserting a further layer of GFP and/or a metal foam, preferably with a thickness of 1 to 10 mm.

The average person skilled in the art recognises that technical features, definitions and/or advantages of preferred embodiments of the safety cabin according to the invention also apply to the manufacturing method according to the invention and described here.

The insertion of fibre-reinforced plastic can preferably be carried out manually, at least in part. To this end, the fibre woven fabrics, non-woven fabrics and/or non-woven materials can preferably be fixed only once in the intended location of the cabin, before laminating, preferably with a resin, e.g. epoxy resin, is carried out. A plurality of layers of fibre reinforcements with differently aligned fibres can be introduced in this manner preferably one on top of another. Individual layers are preferably processed here such that air pockets do not result. This method is particularly simple and cost-effective.

Similarly, inserting layers of fibre-reinforced plastic can preferably take place at an industrial scale, in particular at least partly by machine, preferably comprising steps already mentioned above. In this case, stacks of reinforcements already described above can preferably be formed prior to insertion which are then preferably provided in an RTM method with resin. Curing of the resulting components can preferably be carried out by supplying heat and in the case of significantly reduced air pressure, e.g. in an autoclave. Thus, the individual layers can be particularly effectively connected to one another, with in particular air pockets being avoided and the stability and freedom from maintenance being improved. Such a method can be particularly effectively automated and rationalised, and at the same time raising the quality.

In a further preferred embodiment, provision is made to laminate not only manually or by autoclave, but also by pressing at high pressure. Of course, it is also possible to combine these actions.

The person skilled in the art knows that higher thicknesses than those preferred may result in the corner regions of the cabin, in which preferably fibre-reinforced layers are made to overlap during insertion in order to improve the stability and/or strength.

Introducing a foam can preferably take place by injecting the foam. Similarly, finished foamed elements can preferably be introduced.

In a further embodiment of the invention, the number of the layers of GFP and/or the carbon and/or aramide fibre-reinforced plastic woven fabric in a front region, preferably in a passenger region of the safety cabin is higher than in other regions, in particular in a rear region.

In a further embodiment of the invention, the manufacturing method also comprises the following steps:
  embedding at least one, preferably at least two longitudinal beams made of carbon fibre-reinforced plastic, preferably in an upper region of the safety cabin and/or in a floor region of the safety cabin, in particular connectable to a chassis, longitudinally to the travel direction;
  preferably introducing at least one, preferably 2 to 4 transverse beams, preferably in an upper region of the safety cabin and/or in a floor region, in particular connectable to a chassis, made of carbon fibre-reinforced plastic, transversely to the travel direction.

These elements are preferably made beforehand, e.g. manually or in an automated manner in a prefabricated form. The strength is synergistically increased in particular by transverse and/or longitudinal beams in a floor region, which are connectable and preferably are connected to the chassis. The beams are preferably connectable when they comprise corresponding connection or joining means and/or connection or joining surfaces for a connection to the vehicle.

In a further aspect, the invention relates to a stabilising deformation element for a mobile home or motor home preferably for use in a safety cabin for a mobile home or motor home according to the above description which is configured to increase the safety and/or stabilisation of a passenger compartment of a mobile home or motor home, preferably of a safety cabin.

A further preferred embodiment comprises a manufacturing method, with the carbon fibre-reinforced plastic profiles being manufactured by a pultrusion process.

The pultrusion process or the extrusion process for fibre-reinforced plastic profiles is known here to the average person skilled in the art.

A further preferred embodiment comprises a manufacturing method, comprising the following steps:
  Mounting the lateral external walls or wall regions of the lateral external walls on the chassis to form an external wall of the safety cabin
  Preferably inserting the intermediate wall at a transition from the front region of the cabin to the rear region of the cabin in the transverse direction of the cabin.
  Preferably mounting a ceiling element for a roof of the safety cabin.

The deformation element is configured to increase the safety and/or stabilisation of a passenger compartment of a mobile home or motor home, preferably of a safety cabin. Increasing the safety in particular means an improvement of the stability and/or conversion capability which increases the safety in the case of an accident. This can be measured and/or calculated e.g. during crash tests. Configured means here primarily that such an increase of the safety is brought about by the deformation element.

The average person skilled in the art recognises that technical features, definitions and/or advantages of preferred embodiments of the safety cabin according to the invention and of the deformation element used there also apply to the deformation element described here. In particular, metal foams can also be included by the deformation element.

In a preferred embodiment of the invention, the fibres of the fibre reinforcement and/or of the metal foam comprise a tensile strength of at least 2700 MPa, preferably at least 2850 MPa, more preferably at least 3000 MPa and in particular at least 3500 MPa and/or a modulus of elasticity of at least 70 GPa, preferably at least 100 GPa, more preferably at least 230 GPa and in particular at least 370 GPa and/or an elongation at break of at least 0.7%, preferably at least 1.5%, more preferably at least 2.7% and in particular at least 3.5%, in at least one direction.

However, tensile strengths of at least 1000 MPa, preferably at least 2000 MPa, more preferably at least 3000 MPa and in particular at least 3500 MPa and/or a modulus of elasticity of at least 50 GPa, preferably at least 90 GPa and in particular at least 130 GPa in at least one direction may also be preferred and/or that the deformation element comprises a high (impact) toughness in at least one direction.

In particular, the deformation element can comprises an (impact) toughness of at least XX in at least one direction.

In a further preferred embodiment of the invention, the fibre reinforcement is selected from the group comprising carbon fibres, aramide fibres and/or glass fibres.

In a further preferred embodiment of the invention, the fibre reinforcement comprises fibre rovings, with the fibre rovings comprising a filament count of between 1,000 and 50,000 and/or a fineness of between 30 and 3,500 tex, preferably of between 40 and 400 tex.

The average person skilled in the art recognises that technical features, definitions and/or advantages of preferred embodiments of the deformation element included according to the invention in the safety cabin described above also apply to the deformation element according to the invention and described here.

In a preferred embodiment of the invention, the deformation element comprises a tensile strength of more than 2000 MPa, preferably more than 3000 MPa and in particular more than 3500 MPa.

In a preferred embodiment of the invention, the deformation element comprises carbon fibre-reinforced plastic, preferably comprising aramide (s).

In a further preferred embodiment of the invention, the deformation element comprises at least one stabilising angular element, preferably for stabilising a corner region of the safety cabin according to the above description.

In a further aspect, the invention relates to a method for stabilising a chassis of a mobile home or motor home, preferably of a safety cabin according to the above description, comprising the following steps:

Preferably analysing to determine safety-relevant regions of the passenger compartment and/or of the safety cabin;

Introducing a stabilising deformation element according to the above description in a safety-relevant region of the passenger compartment and/or of the safety cabin.

The average person skilled in the art recognises that technical features, definitions and/or advantages of preferred embodiments of the safety cabin according to the invention and/or of the deformation element according to the invention also apply to the method according to the invention and described here.

In a preferred embodiment, in a first step, the chassis is firstly built with preferably two or more main beams comprising hybrid woven fabrics and/or non-woven fabrics, instead of conventional steel. In a second step, the roof and back panels are then mounted. The established production lines of the manufacturers can advantageously also be used for the safety cabin according to the invention, in addition to conventional superstructures.

DETAILED DESCRIPTION

The invention will be described below in greater detail using examples and figures but without being limited to these.

BRIEF DESCRIPTION OF THE FIGURES

FIG. 11*a* shows the structure of one embodiment of a wall in the cross-section.

FIG. 11*b* shows the structure of a second embodiment of a wall in the cross-section.

FIG. 11*c* shows the structure of a third embodiment of a wall in the cross-section.

DETAILED DESCRIPTION OF THE IMAGE

Figure 1:
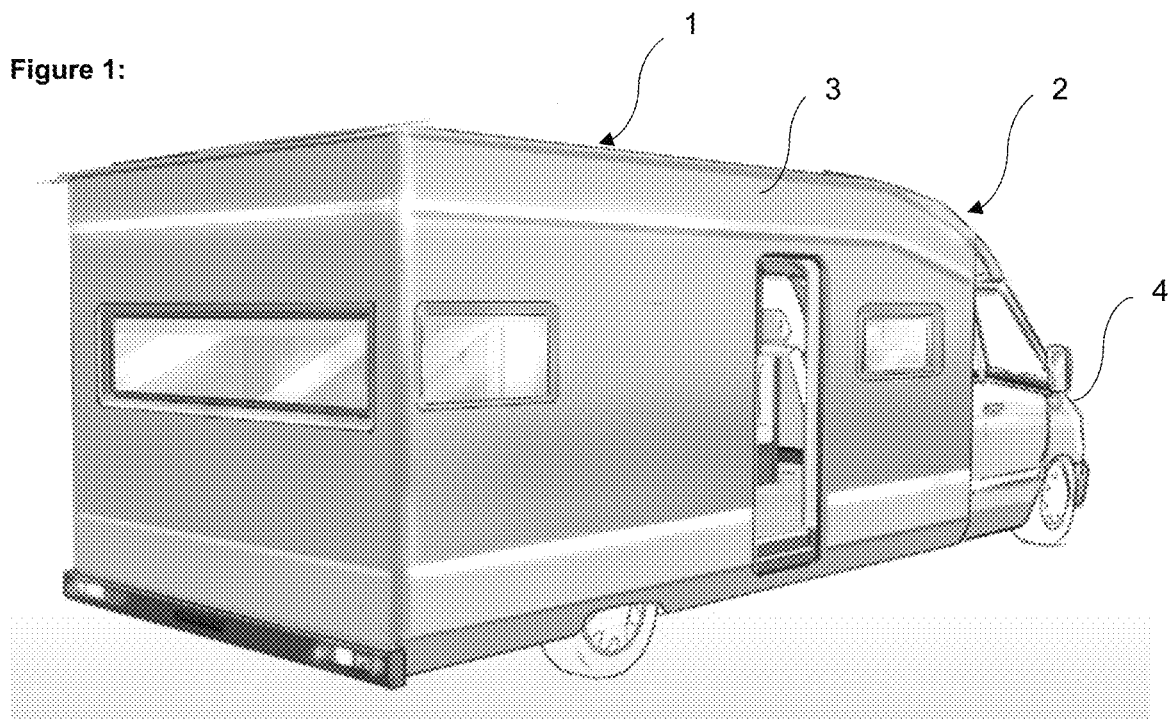
FIG. 1 shows a three-dimensional representation of a mobile home with safety cabin in an external view.

FIG. 1 shows a three-dimensional representation of a mobile home 2 with safety cabin 1 in an external view. The safety cabin 1 with the external regions 3 is located behind the driver compartment 4.

Figure 2:
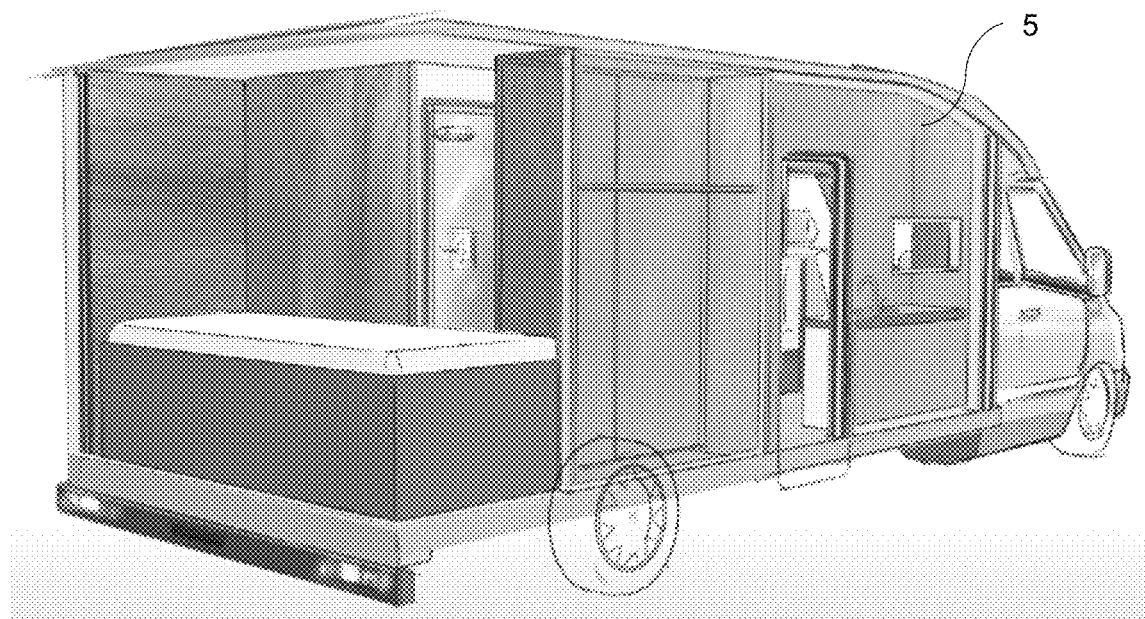
FIG. 2 shows a three-dimensional sectional representation of the mobile home with safety cabin without the front external wall.

FIG. 2 shows a three-dimensional sectional representation of the mobile home 2 with safety cabin 1 without the front external wall. The interior region 5 is clearly visible.

Figure 3:
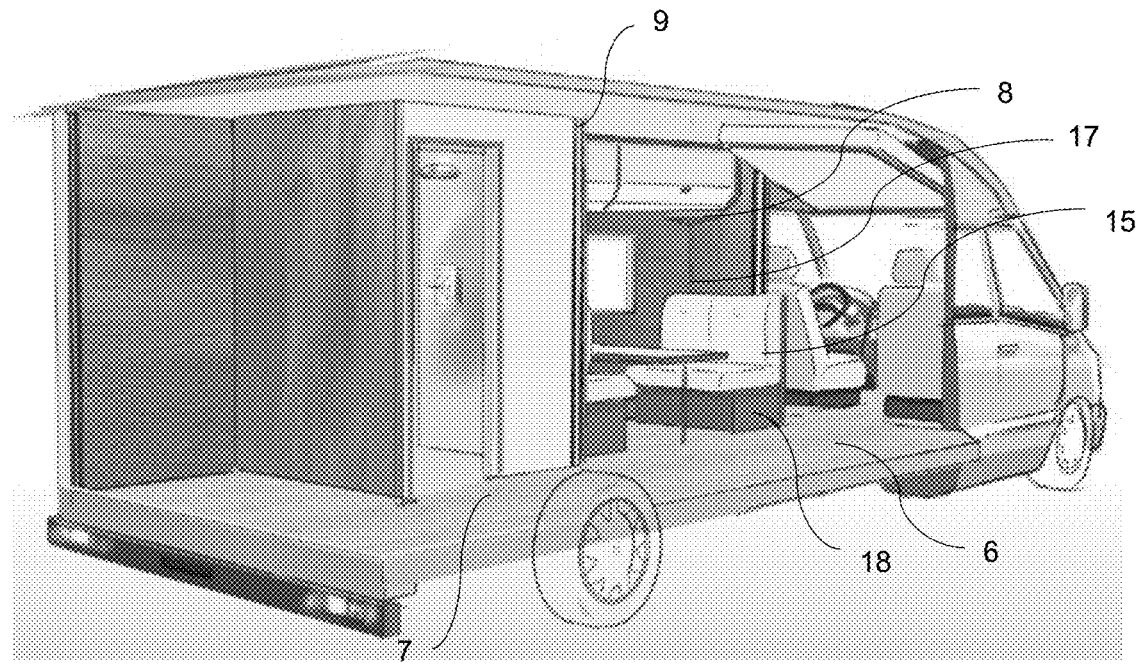
FIG. 3 shows a three-dimensional sectional representation of the mobile home with safety cabin without the front external wall, with essential elements of the internal equipment.

FIG. 3 shows a three-dimensional sectional representation of the mobile home 2 with safety cabin 1 without the front external wall, but including essential internal equipment. In this way, essential safety-relevant features and primarily deformation elements of the cabin 1 can be discerned. The interior region 5 is e.g. divided by a partition in the transverse direction 9 into a front 6 and a rear region 7. The front region 6 is the passenger region during the journey, while in the rear region 7 the bathroom and a bed are housed (see FIG. 2). The seating area counter to the travel direction 15 in the front region 6, which is connected via a connector 18 to the safety cabin, is clearly visible. A stabilising angular element 8 is introduced in a corner region of the cabin 17 above the seating area to increase safety in an unobtrusive manner and appearing to be part of the interior furniture.

Figure 4:
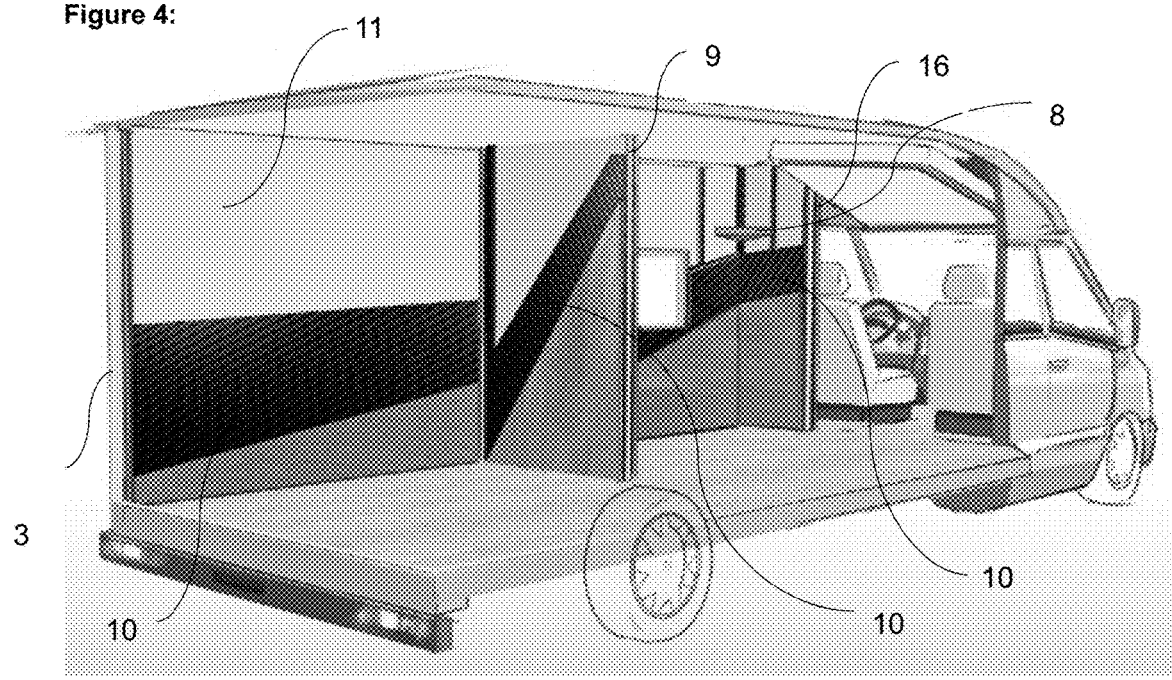
FIG. 4 shows a three-dimensional representation of the mobile home with safety cabin without the front external wall, with a sectional representation of the rear external wall and a partition shown, in the transverse direction.

FIG. 4 shows a three-dimensional representation of the mobile home 2 with safety cabin 1 without the front external wall and the interior furniture with a sectional representation of the rear external wall, with the partition being shown in the transverse direction 9. The layers of glass fibre-reinforced plastic 11 and carbon and/or aramide-fibre reinforced plastic 10 introduced into the external regions 3 and in the partition in the transverse direction 9, which significantly increase the safety of the cabin 1, are visible in the drawing. Since the interior furniture is now shown in this figure, the stabilising angular element 8 can also be clearly discerned in the corner region of the cabin 17.

Figure 5:
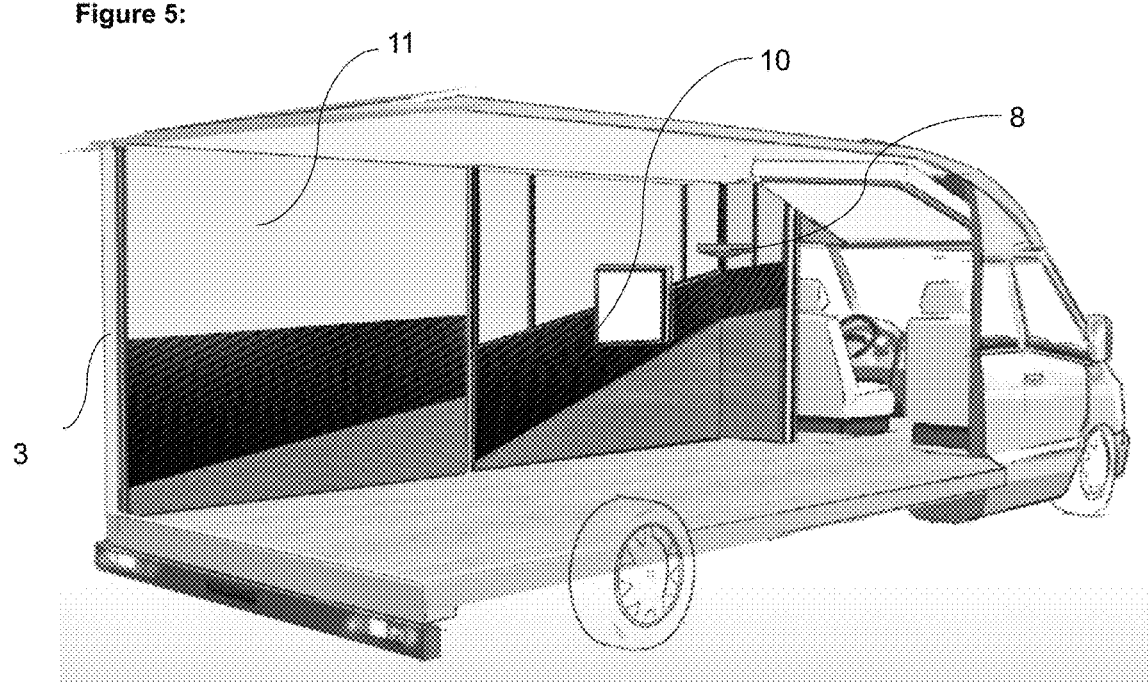
FIG. 5 shows a three-dimensional representation of the mobile home with safety cabin without the front external wall, with a sectional representation of the rear external wall without partition shown, in the transverse direction.

FIG. 5 shows in principle the same representation of the safety cabin 1 as FIG. 4, but without the partition being represented in the transverse direction 9, whereby the introduced layers of glass fibre-reinforced plastic 11 and carbon and/or aramide-fibre reinforced plastic 10 in the external regions 3 of the safety cabin 1 are even more clearly discernible.

Figure 6:
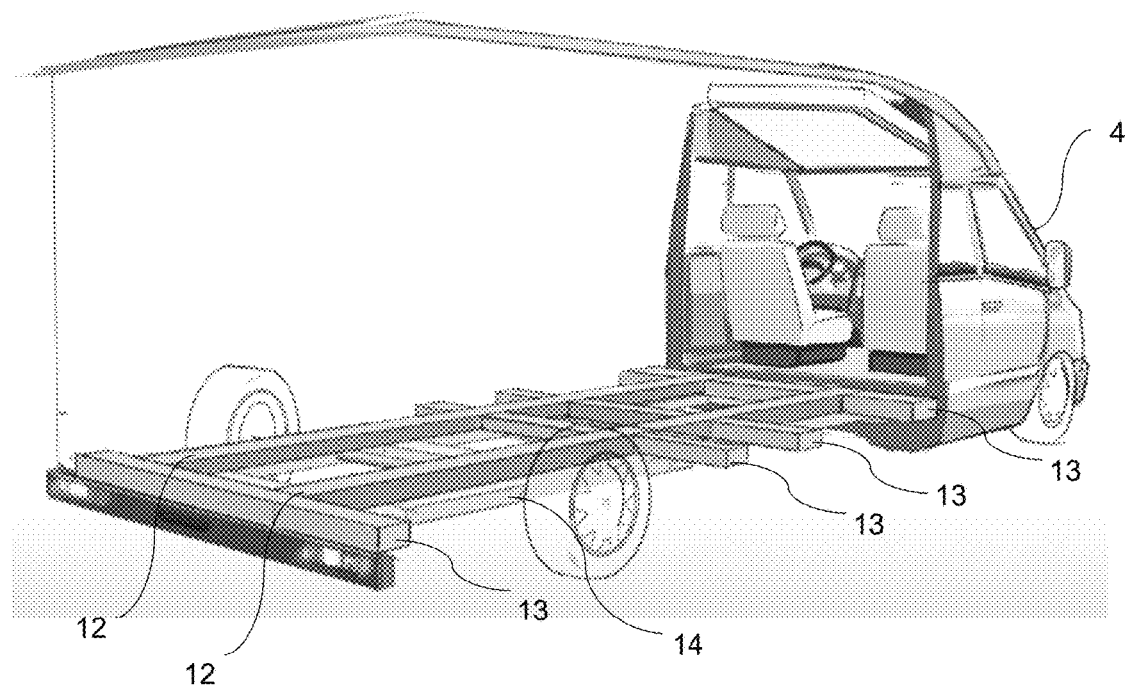
FIG. 6 shows a three-dimensional sectional representation of the mobile home without further parts of the safety cabin, with longitudinal and transverse beams in the floor region of the cabin.

FIG. 6 shows a three-dimensional sectional representation of the mobile home 2 without further parts of the safety cabin 1, with two longitudinal 12 and four transverse beams 13 in the floor region of the cabin 1. They preferably consist of carbon and/or aramide fibre-reinforced plastic and are preferably connected both to the chassis 14 and to the upper structure of the safety cabin 1.

Figure 7:
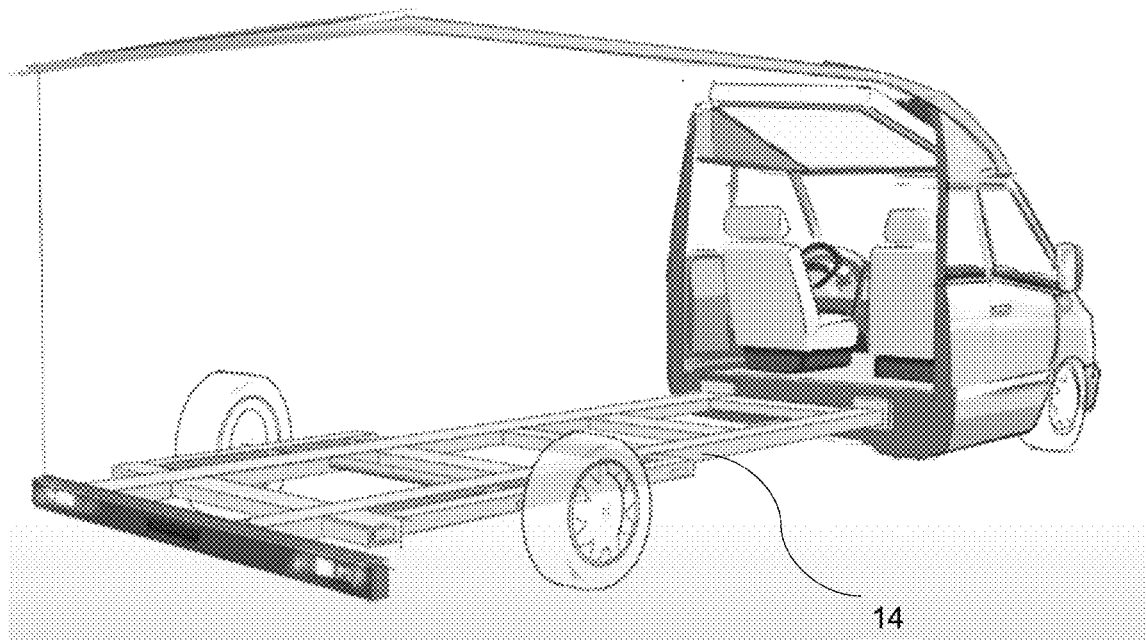
FIG. 7 shows a three-dimensional sectional representation of the mobile home with the chassis.

FIG. 7 shows a three-dimensional sectional representation of the mobile home 2 with the chassis 14 without longitudinal 12 and transverse beam 13.

Figure 8:
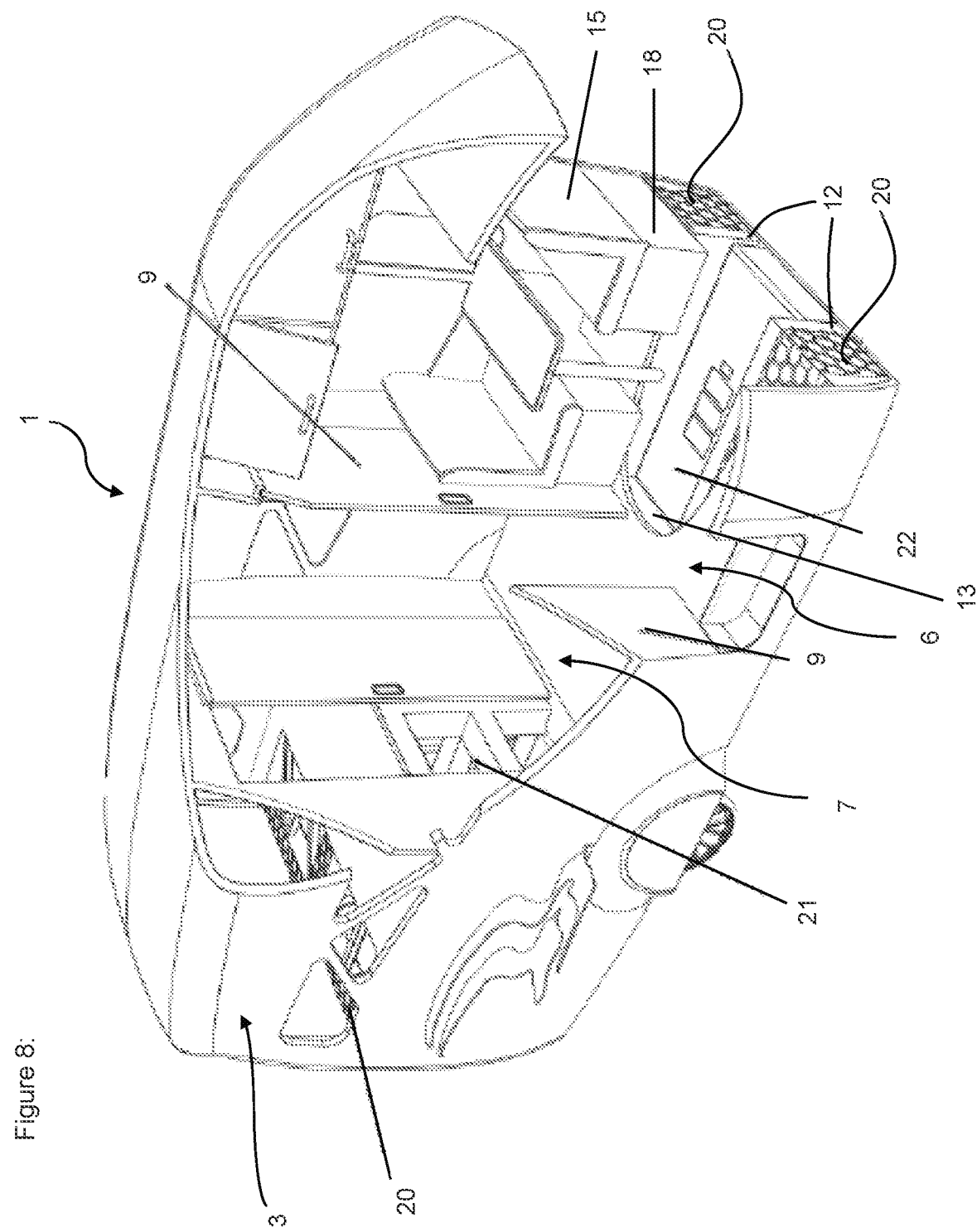
FIG. 8 shows a three-dimensional sectional representation of the safety cabin from a front perspective.

FIG. 8 shows a three-dimensional sectional representation of the safety cabin 1. On one side, the interior region 5 is illustrated and on the other side an external region 3 is illustrated. The intermediate wall 9 divides the safety cabin 1 into two regions. The front region 6 of the safety cabin 1 comprises, inter alia, a seating area 15 counter to the main travel direction, with this seating area preferably being connected via a connector 18 to the chassis. The chassis of the safety cabin 1 comprises a protective box 22. The protective box 22 is preferably configured such that it is surrounded from two sides each by a longitudinal beam 12 comprising preferably a honeycomb 20 and from a further side by a transverse beam 13. The longitudinal beams 12 are preferably configured as foamed profiles comprising hybrid woven fabric and/or non-woven fabric. The protective box 22 is arranged in the front region 6 of the safety cabin 1 and provides a space for a battery and/or a fuel cell with a hydrogen tank. A protective box 21 is also present in the rear region 7. Unlike the front protective box 22, it is not integrated in the chassis. The protective box 21 is configured such that the region to be protected is surrounded by a frame or a framework-like structure of longitudinal and transverse beams, which are connected to the beams (12, 13) of the chassis.

Figure 9:
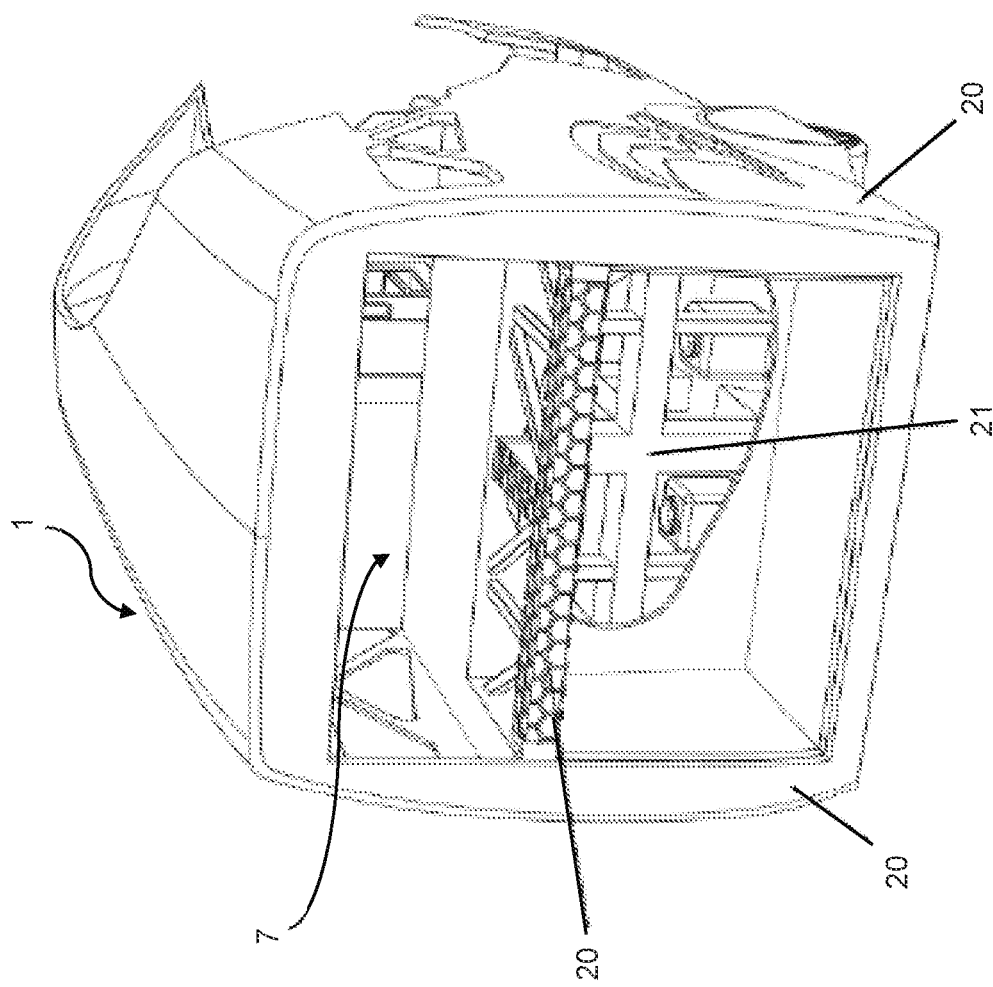
FIG. 9 shows a three-dimensional sectional representation of the safety cabin from a rear perspective.

FIG. 9 shows a three-dimensional sectional representation of the safety cabin 1. In this case, the tail of the safety cabin 1 is in focus. The rear region 7 of the safety cabin can be seen. The rear region 7 comprises a protective box 21. A transverse beam 13 is attached above the protective box 21, which comprises a honeycomb structure 20 made of carbon fibre-reinforced plastic along the circumference. Additionally, the honeycomb structure 20 is included in the edge regions of the chassis.

Figure 10:
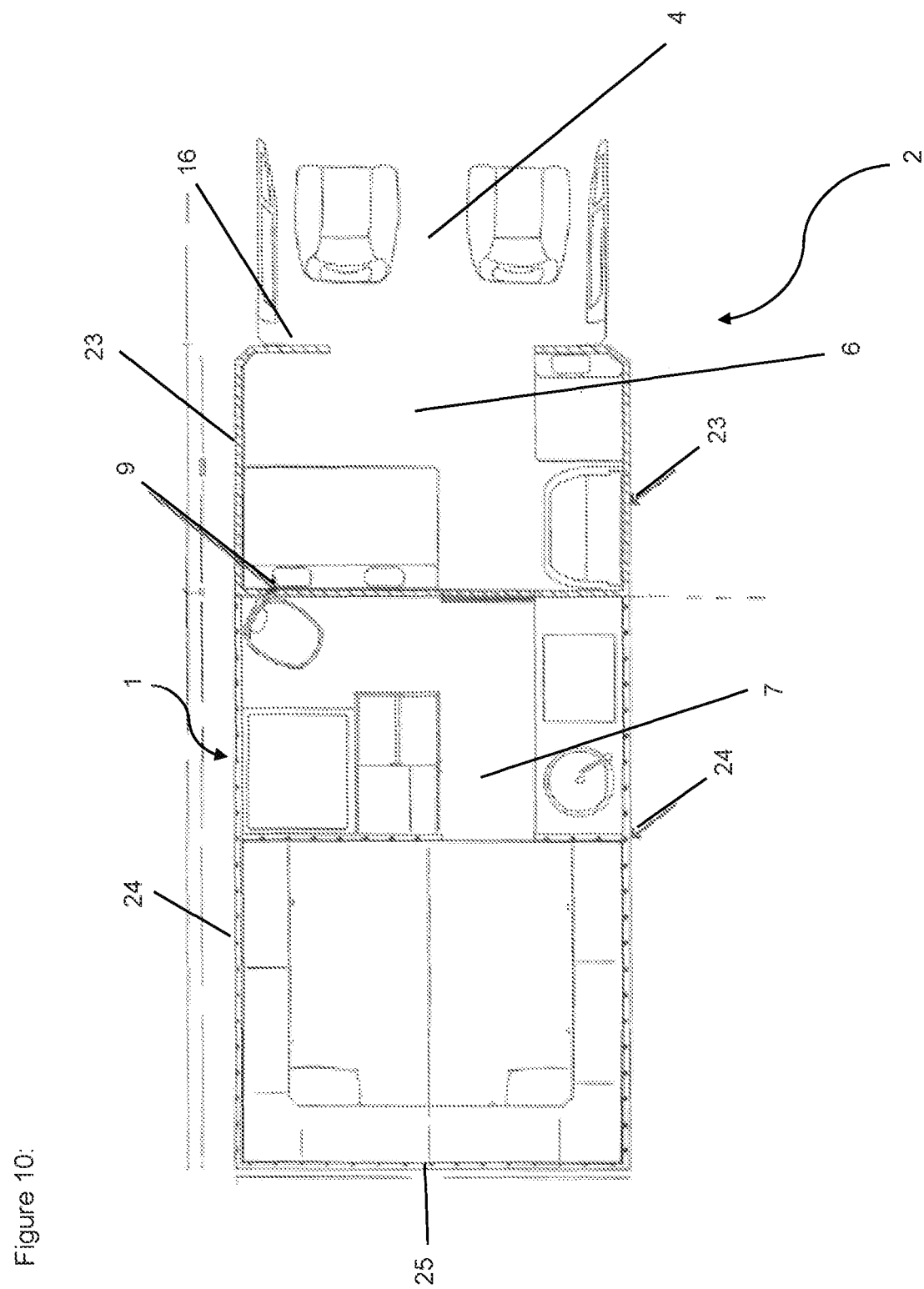
FIG. 10 shows the mobile home or motor home in a top view.

The mobile home or motor home 2 is represented in a top view in FIG. 10. The safety cabin 1 is divided by an intermediate wall 9 into a front 6 and a rear region 7. Additionally, a deformation element 16 is present between the driver compartment 4 and the front region 6 of the safety cabin 1. The external walls of the front region 23 and the intermediate wall 9 and the deformation element 16 preferably comprise a hybrid woven fabric and/or non-woven fabric with 3 to 9 plies per cover layer. The external walls of the rear region (24, 25), in contrast, preferably comprise a hybrid woven fabric and/or non-woven fabric with 1 to 5 plies per cover layer.

FIGS. 11a, 11b and 11c illustrate the structure of an external wall in the cross-section. In this case, the wall is divided into 3 sections. One outer cover layer, in relation to the safety cabin, one inner cover layer, in relation to the safety cabin, and one hard foam ply (XPS) arranged between both cover layers. The external and internal cover layers include, in FIG. 11a, in each case two GFP non-woven fabrics, which each enclose a hybrid non-woven fabric (CFP) from one side. The hybrid non-woven fabric (CFP) is laminated here by three standardised biaxial hybrid non-woven fabrics (CFP) with a fibre alignment of (0°/90°; +/−45°, 90°/0°) with respect to a multi-axial non-woven fabric. The GFP non-woven fabrics have a fibre orientation of (0°/90° or 90°/0°). The structure of the internal cover layer is identical to the external cover layer, except for the arrangement of the fibre orientations of the standardised biaxial non-woven fabric. The fibre orientations of the internal cover layer are here mirror-inverted with respect to the fibre orientations of the external cover layer such that the hard foam ply (XPS) is considered to be a mirror plane or a symmetry plane. FIGS. 11b and 11c differ from FIG. 11a in the number of the laminated biaxial hybrid non-woven fabrics (CFP) and in their fibre orientations.

Figure 12:
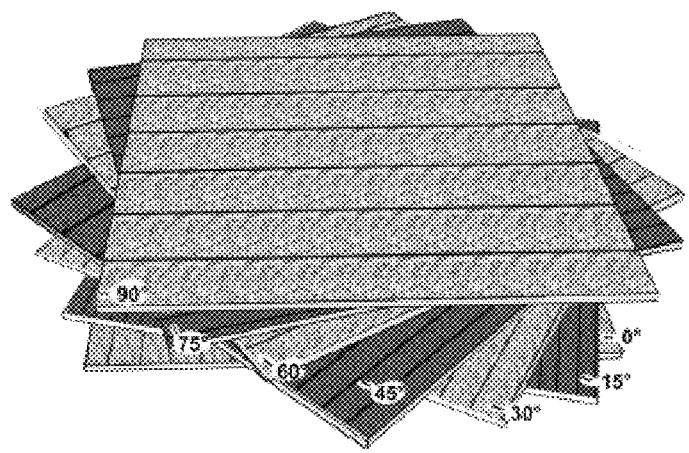
FIG. 12 shows the structure of a multi-axial hybrid non-woven fabric.

FIG. 12 shows the structure of a multi-axial hybrid non-woven fabric. By laminating a plurality of unidirectional non-woven fabrics, the multi-axial non-woven fabric comprises a fibre orientation of (0°/−15°/−30°/−45/°−60°/−75°/−90°).

Figure 13:
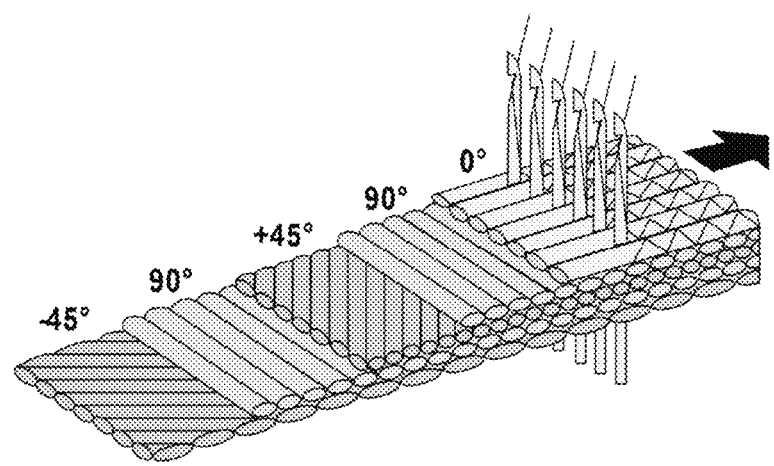
FIG. 13 shows the manufacturing process of a multi-axial non-woven fabric.

FIG. 13 illustrates the manufacturing process of a multi-axial non-woven fabric. The arrow demonstrates the production direction here which the 0° fibre orientation defines.

LIST OF REFERENCE NUMERALS

1 safety cabin
2 mobile home or motor home
3 external region
4 driver compartment
5 interior region
6 front region
7 rear region
8 stabilising angular element
9 partition in the transverse direction
10 carbon and/or aramide fibre-reinforced plastic
11 glass fibre-reinforced plastic
12 longitudinal beam
13 transverse beam
14 chassis
15 seating area counter to travel direction or main travel direction
16 deformation element between driver compartment and interior region
17 corner region of the cabin
18 connector
20 honeycomb structure
21 protective box in the rear region
22 protective box in the front region
23 lateral external wall in the front region
24 lateral external wall in the rear region
25 external wall at the rear of the safety cabin

The invention claimed is:

1. A safety cabin fora mobile home or motor home comprising a part of the safety cabin arrangeable behind a driver compartment
characterized in that
walls of the safety cabin comprise at least one layer of a fibre-reinforced plastic woven fabric and/or non-woven fabric, wherein a layer comprises plies following one another along a transverse direction, wherein plies directly following one another comprise different fibre orientations with respect to one another,
wherein a layer is provided in lateral external walls of the walls of the safety cabin, in a front region of the cabin, in relation to an intended main travel direction, and including at least three to nine plies,
wherein a layer is provided in lateral external walls of the walls of the safety cabin, in a rear region of the cabin, in relation to an intended main travel direction, and including one to five plies,
wherein an intermediate wall of the walls of the safety cabin is present at a transition from the front region of the cabin to the rear region of the cabin, the intermediate wall being arranged transversely to a longitudinal direction of the cabin, wherein the intermediate wall comprises a layer including three to nine plies.

2. The safety cabin according to claim 1,
characterized in that
more plies are included in the front region than in the rear region.

3. The safety cabin according to claim 1,
characterized in that
the fibre reinforcement is selected from the group comprising carbon fibres, aramid fibres and/or glass fibres.

4. The safety cabin according to claim 1,
characterized in that
the plastic non-woven fabric and/or woven fabric is a hybrid non-woven fabric and/or woven fabric which comprises a mixed fibre reinforcement of carbon fibres and aramid fibres.

5. The safety cabin according to claim 1,
characterized in that
in the layer in the front region of the cabin, a hybrid woven fabric and/or non-woven fabric is included, which hybrid fabric and/or non-crimp fabric
i. comprises four plies, wherein the fibre orientations of the plies following one another each differ by an angle of 30° or
ii. comprises six plies, wherein the fibre orientations of the plies following one another each differ by an angle of 18° or
iii. comprises seven plies, wherein the fibre orientations of the plies following one another each differ by an angle of 15°.

6. The safety cabin according to claim 1,
characterized in that
in the layer in the rear region of the cabin, a hybrid woven fabric and/or non-woven fabric is included, which hybrid fabric and/or non-crimp fabric
i. comprises two plies, wherein the fibre orientations of the plies following one another each differ by an angle of 90° or
ii. comprises three plies, wherein the fibre orientations of the plies following one another each differ by an angle of 45°.

7. The safety cabin according to claim 1,
characterized in that
two external plies made of glass fibre-reinforced plastic are included in the layer, which terminate the layer at two opposing external surfaces, wherein the fibre orientation of each external ply preferably differs by 90° from the ply therebelow and/or the other external ply.

8. The safety cabin according to claim 1,
characterized in that
each ply of the layer comprises a thickness of 0.3 mm.

9. The safety cabin according to claim 1,
characterized in that
the walls of the safety cabin comprise at least one foam material.

10. The safety cabin according to claim 9,
characterized in that
the walls of the safety cabin comprise at least two layers of a fibre-reinforced plastic woven fabric and/or non-woven fabric.

11. The safety cabin according to claim 10,
characterized in that
a foam material layer is positioned between the layers, wherein the foam material layer comprises a hard foam material and comprises a thickness of 30 mm.

12. The safety cabin according to claim 10,
characterized in that
the two layers of the fibre-reinforced plastic woven fabric and/or non-woven fabric comprise a ply structure, which is symmetrical in relation to the fibre orientation, with respect to a symmetry plane lying between the layers.

13. The safety cabin according to claim 4,
characterized in that
the fibre reinforcement of the hybrid non-woven fabric and/or woven fabric is included with a weight proportion of between 40% and 60% of aramid fibres, wherein carbon fibres are also included and wherein the weight proportions relate to the total weight of the fibre reinforcement.

14. The safety cabin according to claim 1,
characterized in that
the front and/or a rear region comprises an extension of at least 1.5 m in the longitudinal direction of the safety cabin.

15. The safety cabin according to claim 1,
characterized in that
a chassis of the safety cabin is included, wherein the chassis comprises:
at least one foamed profile comprising hybrid woven fabric and/or non-woven fabric as a longitudinal and/or transverse beam;
at least one panel including hybrid woven fabric and/or non-woven fabric;
at least one layer of the hybrid woven fabric and/or non-woven fabric.

16. The safety cabin according to claim 15,
characterized in that
the chassis comprises, in a lateral edge region at least in sections along the circumference, at least one deformation element.

17. The safety cabin according to claim 15,
characterized in that
the chassis comprises at least one rear axle and/or at least one drive unit.

18. The safety cabin according to claim 1,
characterized in that
the safety cabin comprises at least one battery, at least one fuel cell and/or at least one water tank.

19. The safety cabin according to claim 18,
characterized in that
the battery, fuel cell and/or water tank are housed in a protective box in the front and/or in the rear region of the cabin,
wherein the protective box in the front region is delimited externally at least in sections by at least one deformation element, which in particular comprises a honeycomb structure (20) made of carbon fibre-reinforced plastic and/or at least one foamed profile comprising hybrid woven fabric and/or non-woven fabric.

20. The safety cabin according to claim 1,
characterized in that
an interior region comprises at least one seating area,
wherein the seating area comprises a carbon fibre-reinforced hybrid woven fabric and/or non-woven fabric.

21. The safety cabin according to claim 1,
characterized in that
the safety cabin comprises furniture, in particular at least one seating area, a bench, a cupboard and/or bathroom-partition wall, wherein the furniture, observing load path calculations, is fixedly connected by a fibre-reinforced plastic to the chassis and/or to the safety cabin.

22. The safety cabin according to claim 1,
characterized in that
the lateral external walls of the cabin comprise beams arranged in a framework-like manner and made of carbon fibre-reinforced plastic profiles.

23. A manufacturing method for a safety cabin for a mobile home or motor home comprising at least one part of the safety cabin arrangeable behind a driver compartment, comprising the manufacture of a layer of a fibre-reinforced plastic woven fabric and/or non-woven fabric for a wall of the safety cabin, characterized in that a plurality of plies of a fibre-reinforced plastic woven fabric and/or non-woven fabric are laminated to form one layer, wherein the plies are arranged in a transverse direction of the layer, wherein plies directly following one another comprise different fibre orientations with respect to one another, wherein the layer of a lateral external wall for a front region of the cabin, in the main travel direction, comprises at least three to nine plies, wherein the layer of a lateral external wall for a rear region of the cabin, in the main travel direction, comprises one to five plies, wherein more plies are included in the front region than in the rear region and wherein a layer intended for an intermediate wall in the transverse direction of the cabin comprises three to nine plies.

24. The manufacturing method according to claim 23, further comprising the following steps:

laminating two external plies made of glass fibre-reinforced plastic onto the layer, which terminate the layer at two opposing external surfaces.

25. The manufacturing method according to claim 23, further comprising the following steps:

connecting at least two layers of a fibre-reinforced plastic woven fabric and/or non-woven fabric to a wall or to a wall region of the safety cabin, wherein the two layers of the fibre-reinforced plastic woven fabric and/or non-woven fabric, in relation to the fibre orientation, comprise a symmetrical ply structure with respect to a symmetry plane located between the layers.

26. The manufacturing method according to claim 23, further comprising the following steps:

connecting a wall or a wall region of the front region with a wall or a wall region of the rear region to a lateral external wall or to a wall region of a lateral external wall.

27. The manufacturing method according to claim 23, comprising the manufacture of a chassis of the safety cabin, comprising the step of:

providing at least one foamed profile comprising hybrid woven fabric and/or non-woven fabric for a longitudinal and/or transverse beam.

28. The manufacturing method according to claim 27, wherein carbon fibre-reinforced plastic profiles are manufactured by a pultrusion process.

29. The manufacturing method according to claim 26, comprising the step of:

mounting the lateral external walls or wall regions of the lateral external walls on the chassis to form an external wall of the safety cabin.

* * * * *